United States Patent
Suo et al.

(10) Patent No.: US 8,483,103 B2
(45) Date of Patent: Jul. 9, 2013

(54) METHOD, SYSTEM AND BASE STATION FOR DETERMINING DATA TRANSMISSION OFFSETS

(75) Inventors: Shiqiang Suo, Beijing (CN); Xueming Pan, Beijing (CN); Yingmin Wang, Beijing (CN); Shaohui Sun, Beijing (CN); Yongbin Xie, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 391 days.

(21) Appl. No.: 12/740,506

(22) PCT Filed: Oct. 30, 2008

(86) PCT No.: PCT/CN2008/001823
§ 371 (c)(1),
(2), (4) Date: Jul. 14, 2010

(87) PCT Pub. No.: WO2009/062395
PCT Pub. Date: May 22, 2009

(65) Prior Publication Data
US 2010/0284289 A1  Nov. 11, 2010

(30) Foreign Application Priority Data
Oct. 31, 2007 (CN) .......................... 2007 1 0176659

(51) Int. Cl.
*H04L 5/14* (2006.01)
(52) U.S. Cl.
USPC ............ 370/276; 370/275; 370/296; 370/297

(58) Field of Classification Search
USPC .................................................. 370/275–297
See application file for complete search history.

(56) References Cited

U.S. PATENT DOCUMENTS

| | | | | |
|---|---|---|---|---|
| 6,873,662 | B2 * | 3/2005 | Oh et al. | 375/317 |
| 7,016,316 | B2 * | 3/2006 | Stobart | 370/278 |
| 8,139,548 | B2 * | 3/2012 | Park et al. | 370/336 |
| 2005/0201319 | A1 * | 9/2005 | Lee et al. | 370/321 |

FOREIGN PATENT DOCUMENTS

| | | |
|---|---|---|
| CN | 1917420 A | 2/2007 |
| CN | 1960210 A | 5/2007 |
| WO | 2007/042443 A1 | 4/2007 |

OTHER PUBLICATIONS

International Search Report: PCT/CN2008/001823.

* cited by examiner

*Primary Examiner* — Mark Rinehart
*Assistant Examiner* — Mang Yeung
(74) *Attorney, Agent, or Firm* — Ladas & Parry LLP

(57) ABSTRACT

A method for determining a data transmission offset includes: synchronizing a first time division duplex TDD system with a second TDD system (a500); determining a transmission timing advance of a user terminal according to a deviation between random access time and desired time of the user equipment during establishing the uplink synchronization of the second TDD system (a501); determining an offset of a time slot of the second TDD system according to a time difference between the time slots of the first TDD system and the second TDD system (a502); and obtaining a data transmission offset of the time slot by adding the determined offset of the time slot to the determined transmission timing advance (a503). A system and a base station for determining a data transmission offset are provided.

12 Claims, 13 Drawing Sheets

METHOD, SYSTEM AND BASE STATION FOR DETERMINING DATA TRANSMISSION OFFSETS

CROSS-REFERENCE TO RELATED APPLICATIONS

The present application claims the benefit of priority to International Patent Application No. PCT/CN2008/001823 filed 30 Oct. 2008, which further claims the benefit of priority to Chinese patent Application No. 200710176659.2 filed 31 Oct. 2007, the contents of which are incorporated herein by reference in their entirety.

FIELD OF THE INVENTION

The present invention relates to wireless network communication technologies, and in particular, to a method, a system and a base station for determining a data transmission offset.

BACKGROUND OF THE INVENTION

The $3^{rd}$ Generation (3G) mobile communication system employs a Code Division Multiple Access (CDMA) mode and supports multimedia services. At present, the 3rd Generation Partnership Project (3GPP) has started up a Long Term Evolution (LTE) system using 3G radio interface technologies, so that the delay is reduced, the user data rate is increased, the system capacity and coverage is improved, and the cost of the operator is lowered.

Among the three international standards of the 3G mobile communication systems, the Time Division-Synchronized Code Division Multiple Access (TD-SCDMA) system employs the Time Division Duplex (TDD) mode. The TD-SCDMA system supports asymmetric uplink and downlink service transmission and has a relatively high flexibility on the utilization of frequency spectrum. The TD-SCDMA system synthetically employs the advanced technologies in wireless communications such as smart antenna, uplink synchronization, Joint Detection and software radio, so that the system has high performance and frequency spectrum utilization.

In FIG. 1A which shows a schematic diagram of a frame structure of a TD-SCDMA system, a radio frame of 10 ms contains two half-frames each of 5 ms, and each of the half-frames contains 10 time slots. In FIG. 1A, TS1-TS6 denote normal time slots (in the TD-SCDMA system, a normal time slot may also be referred to as a service time slot); TS0 denotes a downlink broadcast time slot; DwPTS refers to a downlink pilot time slot; GP refers to a guard period; and UpPTS refers to an uplink pilot time slot.

In a TD-SCDMA LTE solution, the following two types of frame structures are provided for an LTE system.

1) The first type of frame structure is applicable to Frequency Division Duplex (FDD) and TDD systems, as shown in FIG. 1B.

The length of the first type of radio frame is 10 ms, and the radio frame consists of 20 time slots which are labeled from 0 to 19 and each have a length of 0.5 ms, and two consecutive time slots are defined as a subframe.

For an FDD system, 10 subframes are available for the uplink and the downlink respectively in every 10 ms, because the uplink and the downlink are separated in the frequency domain; while for a TDD system, 10 subframes are shared by the uplink and the downlink in every 10 ms, and each subframe is allocated to either the uplink or the downlink. However, subframe 0 and subframe 5 are always used for downlink data transmission.

2) The second type of frame structure is applicable to a TDD system, as shown in FIG. 1C.

The length of the second type of radio frame is also 10 ms, and each radio frame is divided into 2 half-frames each of 5 ms, and each half-frame consists of 7 normal time slots (labeled from 0 to 6) and 3 special time slots (a DwPTS, a GP and an UpPTS). Each normal time slot is defined as a subframe. Subframe 0 and the DwPTS are always used for downlink data transmission, while the UpPTS and subframe 1 are always used for uplink data transmission.

In order to be compatible with a TD-SCDMA system, an LTE-TDD system employs the second type of frame structure.

For a TDD system, in order to avoid the interference between the uplink and downlink time slots, a GP is needed for a switch point from the downlink time slot to the uplink time slot.

In order to increase the transmission efficiency of the LTE-TDD system based on the second type of frame structure, enhance the flexibility on the configuration of the special time slots and support different coverage ranges flexibly, the current solution is as follows.

The length of a Cyclic Prefix (CP) of each Orthogonal Frequency Division Multiplexing (OFDM) symbol in the second type of frame structure of the existing LTE-TDD system is shortened, both of the long CP and the short CP should be shortened correspondingly, and specific frame structure parameters are as shown in Table 1. The total length of each normal time slot is 20736 Ts (0.675 ms), and the normal time slot consists of a data part with a length of 19744 Ts (0.6427 ms) and a Guard Interval (GI) part with a length of 992 Ts (32.29 µs) for a switch between time slots. In the case of a short CP configuration, the data part of each normal time slot consists of 9 OFDM symbols, the CP length of the first OFDM symbol is 160 Ts (5.21 µs), and the CP length of each of the other 8 OFDM symbols is 144 Ts (4.69 µs), which is consistent with the first type of frame structure. In the case of a long CP configuration, the data part of each normal time slot consists of 8 OFDM symbols, the CP length of each of the first and the second OFDM symbols is 432 Ts (14.06 µs), and the CP length of each of the other 6 OFDM symbols is 416 Ts (13.54 µs).

Here, Ts is a unit of sampling time, and 1 Ts=1/(15000*2048) seconds.

TABLE 1

Parameters of LTE-TDD frame structure after adjusting the CP length

| | Length of Normal Time Slot | Number of OFDM Symbols | CP Length | |
|---|---|---|---|---|
| Short CP | A total Length of 20736 Ts (0.675 ms), with a Data Part of 19744 Ts (0.6427 ms) | 9 | CP length of the First OFDM Symbol is 160 Ts (5.21 µs) | CP length of each of the other 8 OFDM Symbols is 144 Ts (4.69 µs) |

TABLE 1-continued

Parameters of LTE-TDD frame structure after adjusting the CP length

| | Length of Normal Time Slot | Number of OFDM Symbols | CP Length | |
|---|---|---|---|---|
| Long CP | and a GI Part of 992 Ts (32.29 μs) | 8 | CP length of each of the First 2 OFDM Symbols is 432 Ts (14.06 μs) | CP length of each of the other 6 OFDM Symbols is 416 Ts (13.54 μs) |

The redundant time length may be used for extending the special time slots by overlapping the GI part of each normal time slot on the data part of the adjacent time slot.

FIG. 2A shows a frame structure in which the special time slots are extended by overlapping the GI part of each normal time slot on the data part of the adjacent time slot when the GI part of each normal time slot lies in front of the data part of the normal time slot.

FIG. 2B shows a frame structure in which the special time slots are extended by overlapping the GI part of each normal time slot on the data part of the adjacent time slot when the GI part of each normal time slot lies behind the data part of the normal time slot.

In addition, the GI part in time slot TS0 may not overlap the data part of the adjacent time slot, as shown in FIGS. 2C and 2D.

After the GI part of each normal time slot overlaps the data part of the adjacent time slot, no GI part actually exists between the data parts of the time slots, and an equivalent frame structure thus formed is as shown in FIG. 2E, where the length of the data part of each normal time slot is 642.7 μs, the length of the special time slot is 501.04 μs, and the special time slot consists of three parts including a DwPTS, a GP and an UpPTS; the DwPTS is used for transmitting a primary synchronization signal, and the UpPTS is used for random access.

In the case that the total length of the special time slot keeps constant as 501.04 μs, the time slot lengths of the three time slots, i.e., the DwPTS, the GP and the UpPTS, may be adjusted flexibly, where the minimum length of the DwPTS is the length of an OFDM symbol that contains a long CP, i.e., 80.73 μs; when the UpPTS is used for random access, its minimum length is the length of two OFDM symbols that contain no CP, i.e., 133.33 μs. By adjusting the lengths of the three time slots in the special time slot, different coverage ranges may be supported flexibly, and the transmission efficiency may be increased.

Although, via the above LTE-TDD frame structure, the transmission efficiency of the LTE-TDD system can be increased effectively and different coverage ranges can be supported flexibly, because the time slots of the frame structure modified are not aligned with the time slots of the frame structure of the TD-SCDMA system, serious interference between the systems may be caused when the LTE-TDD system and the TD-SCDMA system are co-located in adjacent channel frequency. As shown in FIG. 2F, in the frame structures of the LTE-TDD system and the TD-SCDMA system, if time slot allocation ratios in the two systems are the same, that is, the uplink-to-downlink switch points are both configured between time slots TS3 and TS4, then a part of the uplink time slot TS3 of the LTE-TDD system falls in the downlink time slot TS4 of the TD-SCDMA system, which results in that a base station including the LTE-TDD system may directly receive the signals transmitted by a base station including the TD-SCDMA system, thereby causing serious interference between the systems.

In summary, at present, when the LTE-TDD system and the TD-SCDMA system are co-located in adjacent channel frequency, serious interference between the systems may be caused.

SUMMARY OF THE INVENTION

The embodiments of the invention provide a method, a system and a base station for determining an offset of a time slot, thereby solving the problem of the prior art that serious interference between systems may be caused when two TDD systems are co-located in adjacent channel frequency.

An embodiment of the invention provides a method for determining an offset of a time slot, including:

synchronizing a first TDD system with a second TDD system; and determining an offset of a time slot of the second TDD system according to a time difference between the time slots of the first TDD system and the second TDD system.

An embodiment of the invention provides a system for determining an offset of a time slot, including: a first TDD base station including a first TDD system. The system for determining the offset of the time slot further includes:

a second TDD base station including a second TDD system, adapted to synchronize the first TDD system with the second TDD system, and determine an offset of a time slot of the second TDD system according to a time difference between the time slots of the first TDD system and the second TDD system.

An embodiment of the invention provides a base station, including:

a matching module, adapted to synchronize a first TDD system included in a first TDD base station with a second TDD system included in the base station; and an offset determination module, adapted to determine an offset of a time slot of the second TDD system according to a time difference between the time slots of the first TDD system and the second TDD system.

In the embodiments of the invention, the offset of each time slot of the second TDD system is determined according to the time difference between the time slots of the first TDD system and the second TDD system, so that the uplink-to-downlink switch points of the two TDD systems are made to align with each other, thereby eliminating the interference between systems when two TDD systems are co-located in adjacent channel frequency.

DETAILED DESCRIPTION OF THE EMBODIMENTS

In the embodiments of the invention, the offset of each time slot of a second TDD system is determined according to a time difference between the time slots of the first TDD system and the second TDD system, and the data transmission offset of each time slot is obtained by adding the offset of the time slot of the second TDD system to a transmission timing advance of a user equipment, thus ensuring that uplink-to-downlink switch points of the two TDD systems are aligned with each other, thereby eliminating the interference between the two TDD systems that are co-located in adjacent channel frequency.

The embodiments of the invention will now be further described in detail in conjunction with the drawings.

Figure 1A:
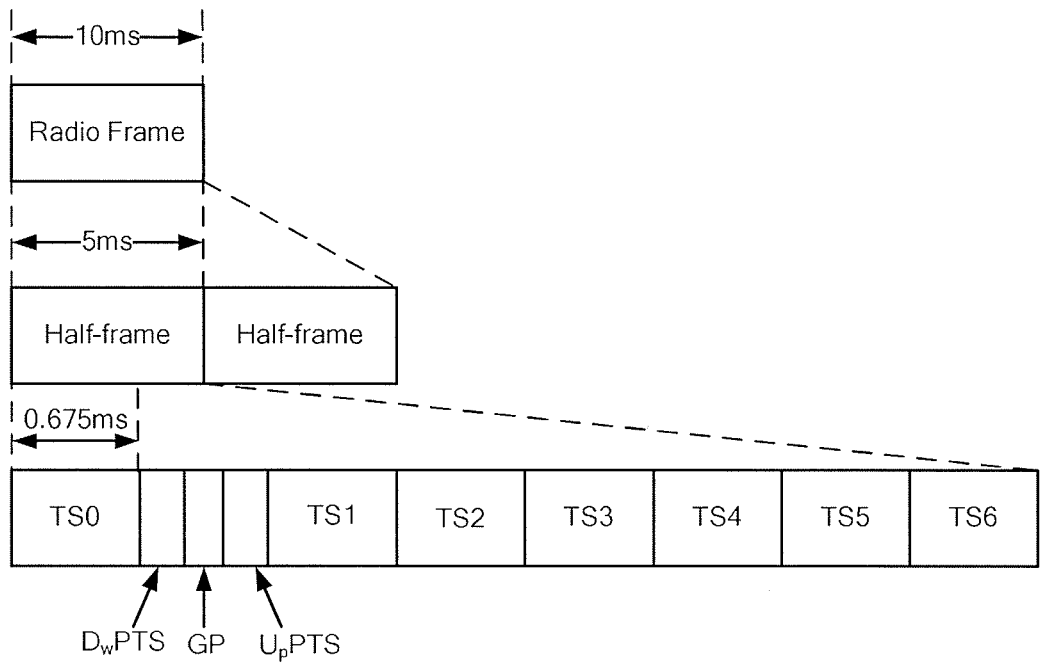
FIG. 1A is a schematic diagram of a frame structure of a TD-SCDMA system in the prior art.
Figure 1B:
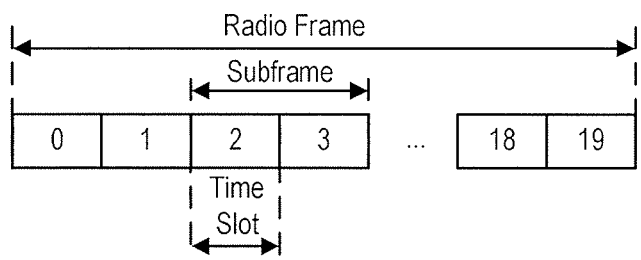
FIG. 1B is a schematic diagram of the first type of frame structure of an LTE system in the prior art.
Figure 1C:
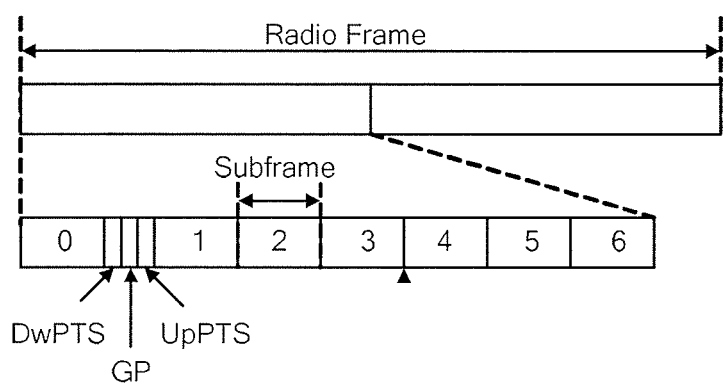
FIG. 1C is a schematic diagram of the second type of frame structure of an LTE system in the prior art.
Figure 2A:
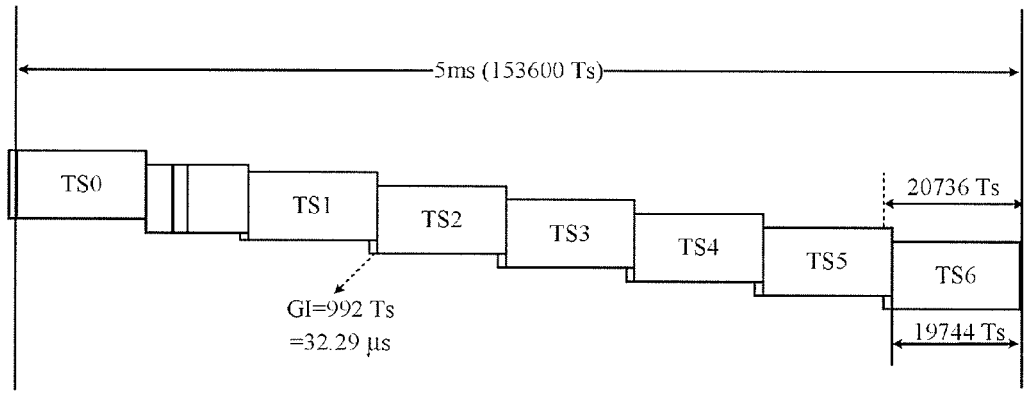
FIG. 2A is a schematic diagram of the second type of frame structure of an LTE system in the prior art when the GI part of each normal time slot lies in front of the data part of the normal time slot and the GI part of each normal time slot overlaps the data part of the adjacent time slot.
Figure 2B:
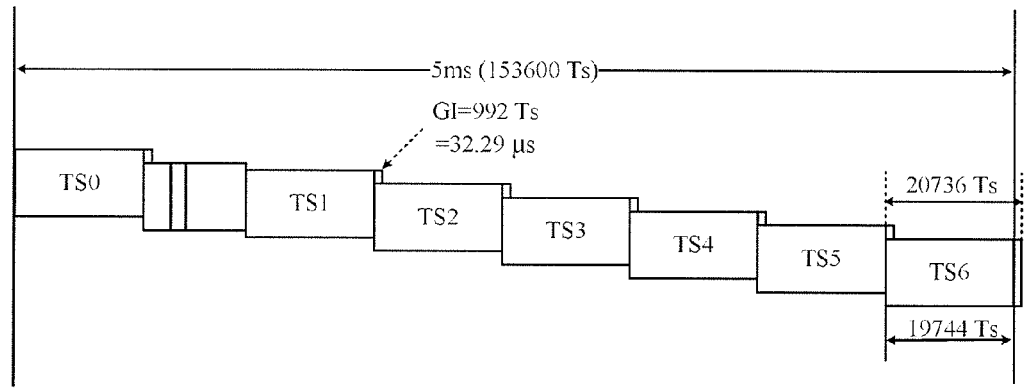
FIG. 2B is a schematic diagram of the second type of frame structure of an LTE system in the prior art when the GI part of each normal time slot lies behind the data part of the normal time slot and the GI part of each normal time slot overlaps the data part of the adjacent time slot.
Figure 2C:
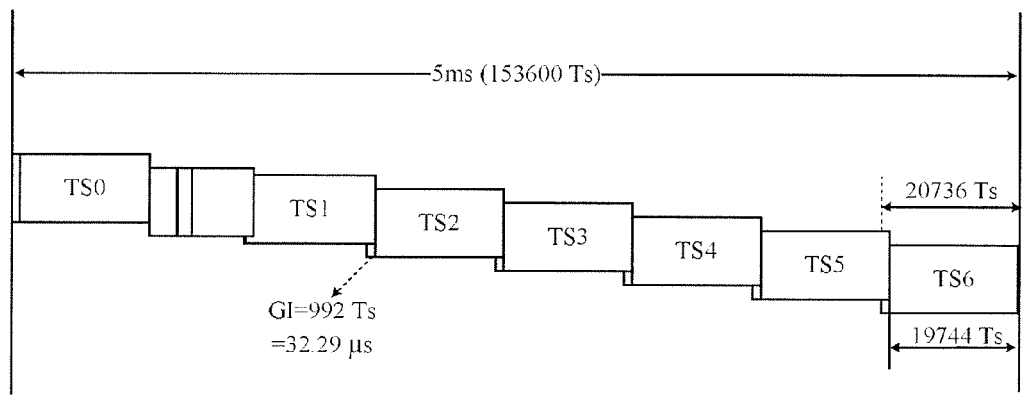
FIG. 2C is a schematic diagram of the second type of frame structure of an LTE system in the prior art when the GI part of each normal time slot lies in front of the data part of the normal time slot and the GI part of time slot TS0 does not overlap the data part of the adjacent time slot.
Figure 2D:
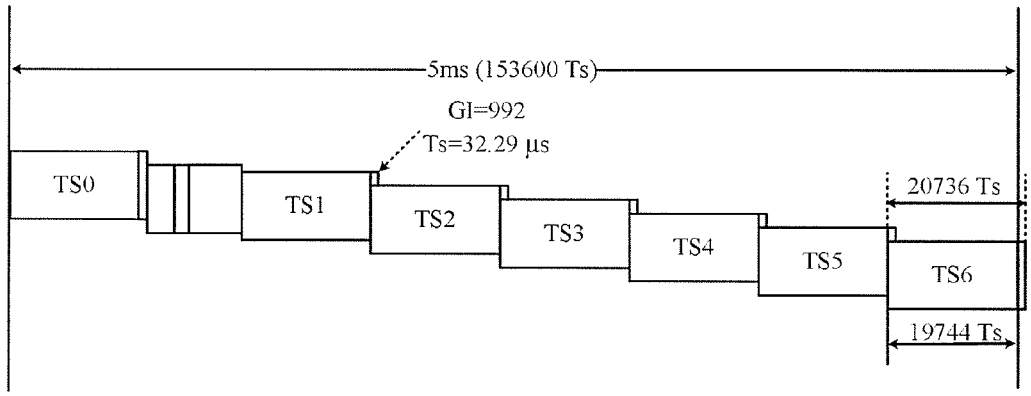
FIG. 2D is a schematic diagram of the second type of frame structure of an LTE system in the prior art when the GI part of each normal time slot lies behind the data part of the normal time slot and the GI part of time slot TS0 does not overlap the data part of the adjacent time slot.
Figure 2E:
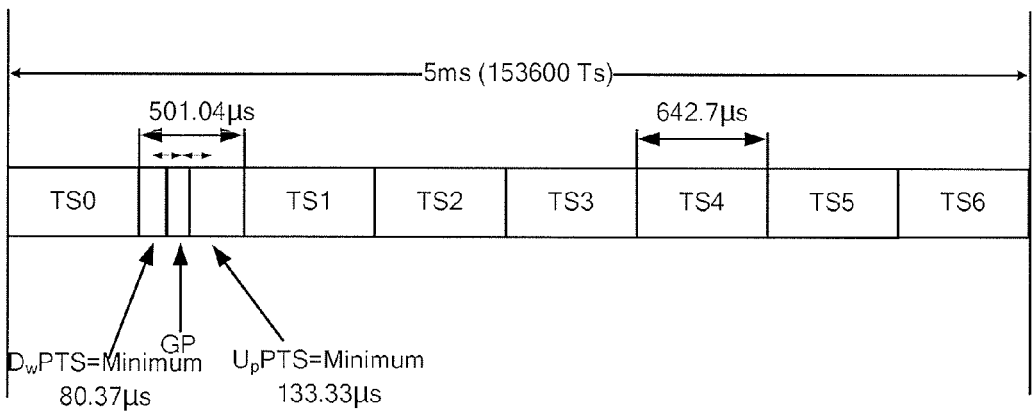
FIG. 2E is a schematic diagram of an equivalent frame structure of an LTE system in the prior art after the GI part of each normal time slot overlaps the data part of the adjacent time slot.
Figure 2F:
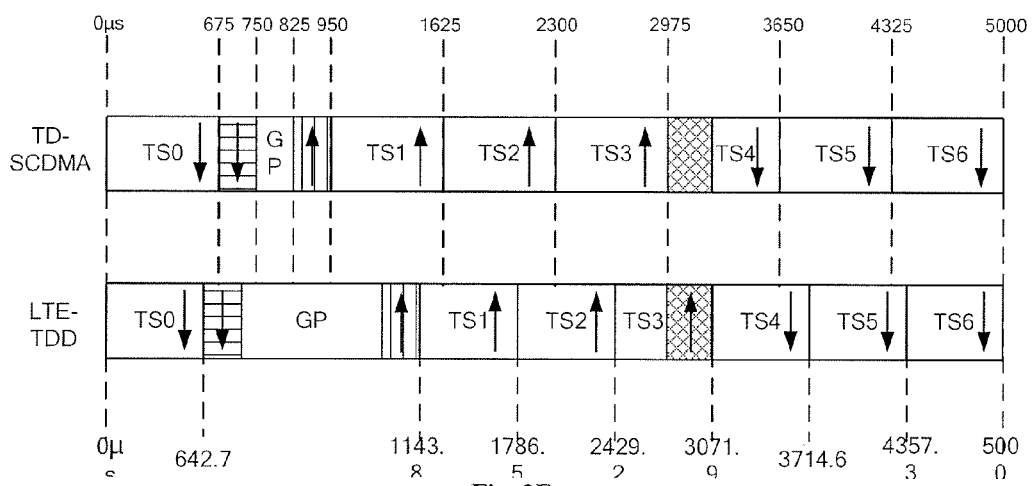
FIG. 2F is a schematic diagram showing the interference between an LTE-TDD system and a TD-SCDMA system that are co-located in adjacent channel frequency in the prior art.
Figure 3:
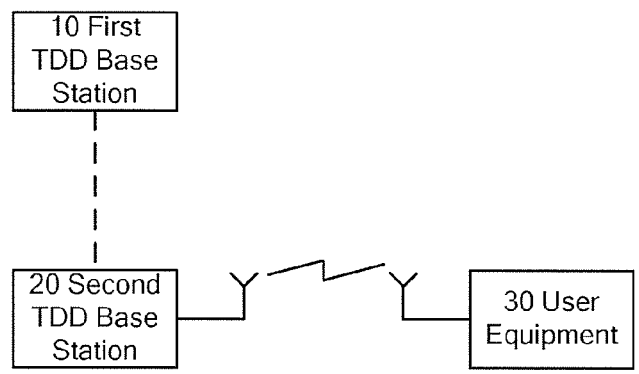
FIG. 3 is a schematic diagram showing a structure of a system for determining a data transmission offset according to an embodiment of the invention.

As shown in FIG. 3, a system for determining a data transmission offset according to an embodiment of the invention includes: a first TDD base station 10 including a first TDD system, a second TDD base station 20 including a second TDD system, and a user equipment 30.

The second TDD base station 20 is wirelessly connected with the first TDD base station 10 and the user equipment 30, and is adapted to synchronize the first TDD system with the second TDD system, determine a transmission timing advance of the user equipment 30 according to a deviation between random access time and desired time of the user equipment 30 during establishing uplink synchronization of the second TDD system, determine an offset of a time slot of the second TDD system according to a time difference between the time slots of the first TDD system and the second TDD system, and obtain the data transmission offset of the time slot by adding the offset of the time slot determined to the transmission timing advance determined.

The second TDD base station 20 transmits the data transmission offset of the uplink time slot obtained to the user equipment 30.

The user equipment 30 transmits data to the second TDD base station 20 via the uplink time slot of the second TDD system according to the data transmission offset of the uplink time slot received from the second TDD base station 20.

The second TDD base station 20 transmits data to the user equipment 30 via the downlink time slot of the second TDD system according to the data transmission offset of the downlink time slot obtained.

Figure 4A:
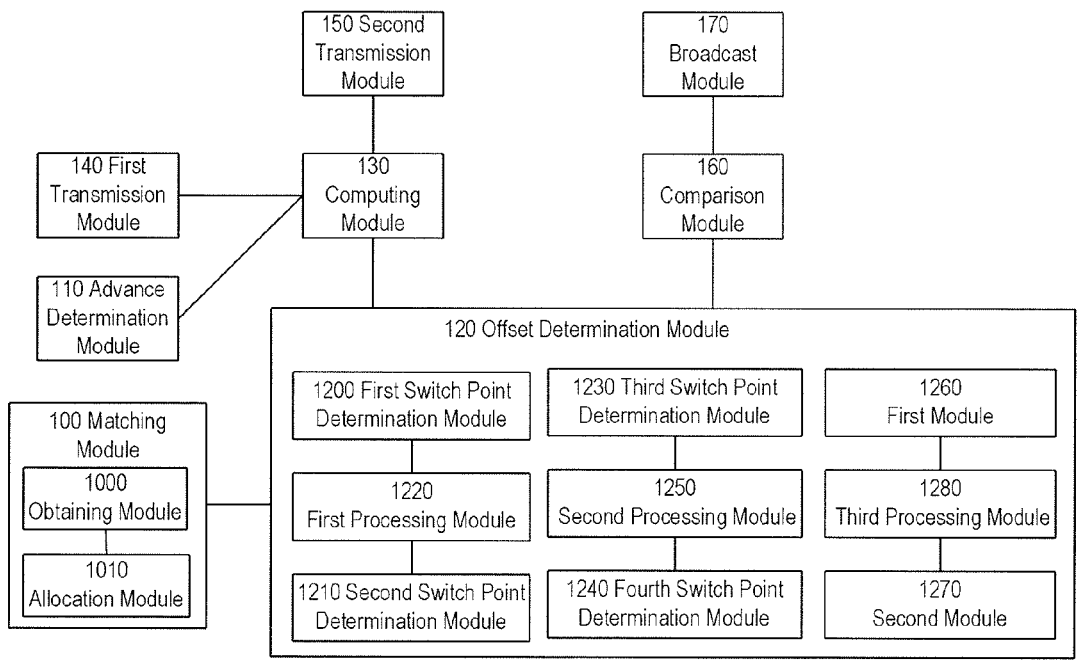
FIG. 4A is a schematic diagram showing a structure of a base station according to an embodiment of the invention.

As shown in FIG. 4A, a base station according to an embodiment of the invention includes: a matching module 100, an advance determination module 110, an offset determination module 120 and a computing module 130.

A second TDD system included in the base station according to the embodiment of the invention is co-located in adjacent channel frequency with a first TDD system of a first TDD base station.

The matching module 100 is connected with the offset determination module 120, and is adapted to synchronize the first TDD system included in the first TDD base station and the second TDD system included in the base station in which the matching module 100 exists.

In this embodiment, the first TDD system and the second TDD system may be one of the following systems, respectively (without limitation):

an LTE-TDD system, a TD-SCDMA system, a High Chips Rate-Time Division Duplex (HCR-TDD) system and a Worldwide Interoperability for Microwave Access (WiMAX) system, etc.

The matching module 100 may further include an obtaining module 1000 and an allocation module 1010.

The obtaining module 1000 is adapted to obtain a timing clock and a time slot allocation ratio of the first TDD system.

There are various modes for obtaining the timing clock and the time slot allocation ratio of the first TDD system, for example:

obtaining the timing clock and the time slot allocation ratio of the first TDD system directly from the first TDD base station after being connected with the first TDD base station; or sending a message for obtaining the timing clock and the time slot allocation ratio of the first TDD system to the first TDD base station, and receiving the timing clock and the time slot allocation ratio of the first TDD system returned by the first TDD base station after receiving the message.

The allocation module 1010 is adapted to determine starting time of the second TDD system according to the timing clock obtained by the obtaining module 1000, and allocate the time slots of the second TDD system according to the time slot allocation ratio obtained by the obtaining module 1000.

In order to guarantee that the first TDD system and the second TDD system are co-located in adjacent channel frequency, the time slots of the second TDD system are allocated according to the time slot allocation ratio of the first TDD system. In order to guarantee the accuracy of the offset determined, the starting time of the second TDD system is determined according to the timing clock of the first TDD system.

The advance determination module 110 is connected with the computing module 130, and is adapted to determine a transmission timing advance of a user equipment according to a deviation between random access time and desired time of the user equipment during establishing uplink synchronization of the second TDD system.

The offset determination module 120 is connected with the matching module 100 and the computing module 130, and is adapted to determine an offset of a time slot of the second TDD system according to a time difference between the time slots of the first TDD system and the second TDD system.

Here, the offset determination module 120 needs to determine the offset of each time slot of the second TDD system so as to make the uplink-to-downlink switch points of the two TDD systems to align with each other, thereby avoiding the interference between the two TDD systems that are co-located in adjacent channel frequency.

The modes for determining the offset of the time slot of the second TDD system include but not limited to the following three modes.

Regarding mode 1, each time slot of the second TDD system is offset by the same time, so long as the uplink-to-downlink switch points of the two TDD systems are made to align with each other. In such a mode, the offset determination module 120 may further include a first switch point determination module 1200, a second switch point determination module 1210 and a first processing module 1220.

The first switch point determination module 1200 is adapted to determine a first switch point between the uplink and downlink time slots of the first TDD system.

The second switch point determination module 1210 is adapted to determine a second switch point between the uplink and downlink time slots of the second TDD system.

The first processing module 1220 is adapted to provide a time difference between the first switch point determined by the first switch point determination module 1200 and the second switch point determined by the second switch point determination module 1210 as the offset of each time slot of the second TDD system.

Regarding mode 2, each uplink time slot of the second TDD system is offset by the same time so as to guarantee that the uplink-to-downlink switch points of the two TDD systems are made to align with each other. In such a mode, the offset determination module 120 may further include a third switch point determination module 1230, a fourth switch point determination module 1240 and a second processing module 1250.

The third switch point determination module 1230 is adapted to determine a first switch point between the uplink and downlink time slots of the first TDD system.

The fourth switch point determination module 1240 is adapted to determine a second switch point between the uplink and downlink time slots of the second TDD system.

The second processing module 1250 is adapted to provide a time difference between the first switch point determined by the third switch point determination module 1230 and the second switch point determined by the fourth switch point determination module 1240 as the offset of each uplink time slot of the second TDD system, while the offsets of other time slots of the second TDD system are zero.

Regarding mode 3, each time slot in the two TDD systems is made to align with each other, thus ensuring that the uplink-to-downlink switch points of the two TDD systems are made to align with each other, while the offset of each time slot of the second TDD system is different from each other. In such a mode, the offset determination module 120 may further include a first module 1260, a second module 1270 and a third processing module 1280.

The first module 1260 is adapted to determine first starting points of each normal time slot and a DwPTS and a first ending point of an UpPTS of the first TDD system.

The second module 1270 is adapted to determine second starting points of each normal time slot and a DwPTS and a second ending point of an UpPTS of the second TDD system.

The third processing module 1280 is adapted to provide a time difference between the first starting point and the second starting point of normal time slots corresponding to the same time slot identifier determined by the first module 1260 and the second module 1270 as an offset of the normal time slot corresponding to the time slot identifier of the second TDD system, provide a time difference between the first starting point and the second starting point of the DwPTSs determined by the first module 1260 and the second module 1270 as an offset of the DwPTS of the second TDD system, and provide a time difference between the first ending point and the second ending point of the UpPTSs determined by the first module 1260 and the second module 1270 as an offset of the UpPTS of the second TDD system.

The computing module 130 is connected with the advance determination module 110 and the offset determination module 120, and is adapted to obtain a data transmission offset of the time slot of the second TDD system by adding the offset of the time slot determined by the offset determination module 120 to the transmission timing advance determined by the advance determination module 110.

However, when the above three modes for determining the offset of the time slot of the second TDD system are employed, the offset GP in the special time slot of the second TDD system may not overlap the GP in the special time slot of the first TDD system in the time domain, that is, interference appears at the downlink-to-uplink switch point; in this situation, the length of at least one of the UpPTS and the DwPTS in the special time slot of the second TDD system may be adjusted, thus the base station according to the embodiment of the invention may further include a comparison module 160 and a broadcast module 170.

The comparison module 160 is connected with the offset determination module 120 and the broadcast module 170, and is adapted to adjust the length of at least one of the UpPTS and the DwPTS in the special time slot of the second TDD system if the GP in the special time slot of the second TDD system that is offset according to the offset determined by the offset determination module 120 does not overlap the GP in the special time slot of the first TDD system.

In the embodiment of the invention, the comparison module 160 may adjust the length of at least one of the UpPTS and the DwPTS as required so as to guarantee that the GP of the second TDD system that has been adjusted at least partially overlaps the GP of the first TDD system; if the GP of the second TDD system that has been adjusted and the GP of the first TDD system are completely overlapped, the transmission efficiency of the system may be improved.

If further increased transmission efficiency of the system is desired, the middle time point of the GP of the second TDD system may be made to align with the middle time point of the GP of the first TDD system by adjusting the length of at least one of the UpPTS and the DwPTS of the second TDD system.

An preferred embodiment of the above mode 3 is as follows: the lengths of the UpPTS and the DwPTS of the second TDD system are both configured as the minimum length, that is, the length of the UpPTS is 133.33 μs, and the length of the DwPTS is 80.37 μs, thus ensuring that the GP of the second TDD system that has been offset at least partially overlaps the GP of the first TDD system.

The broadcast module 170 is connected with the comparison module 160, and is adapted to broadcast special time slot configuration information of the second TDD system that is adjusted by the comparison module 160.

The base station according to the embodiment of the invention may further include a first transmission module 140.

The first transmission module 140 is connected with the computing module 130, and is adapted to transmit the data transmission offset of the uplink time slot obtained by the computing module 130 to a user equipment.

The base station according to the embodiment of the invention may further include a second transmission module 150.

The second transmission module 150 is connected with the computing module 130, and is adapted to transmit data to a user equipment via the downlink time slot of the second TDD system according to the data transmission offset of the downlink time slot obtained by the computing module 130.

Figure 4B:
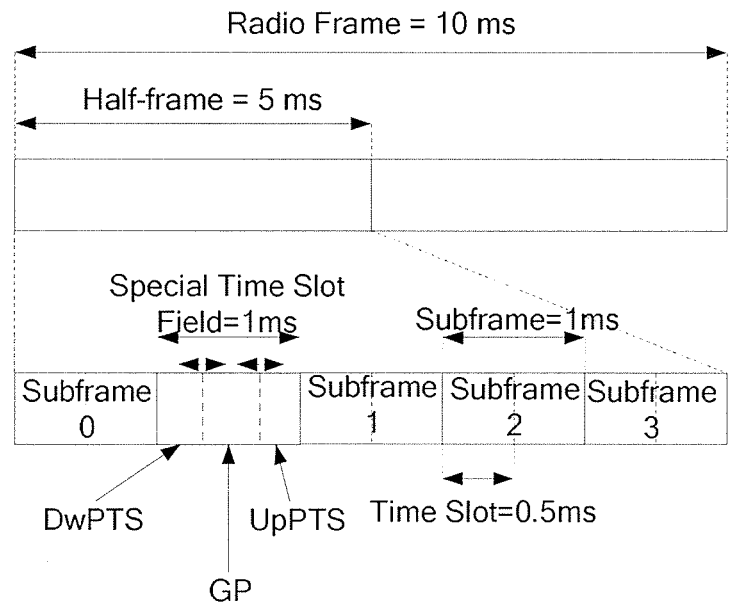
FIG. 4B is a schematic diagram of a frame structure according to an embodiment of the invention where each half-frame contains 8 normal time slots and 1 special time slot field.

In the embodiments of the invention, the TDD system has two types of frame structures: in one frame structure, each half-frame of 5 ms contains 7 normal time slots and 1 special time slot field; in the other frame structure, each half-frame of 5 ms contains 8 normal time slots and 1 special time slot field, as shown in FIG. 4B.

In FIG. 4B, a radio frame of 10 ms contains two half-frames each of 5 ms, each half-frame of 5 ms is divided into 8 normal time slots and 1 special time slot field, where the lengths of the 8 normal time slots are equal to each other, which are all 0.5 ms, the length of the special time slot field is 1 ms, and two consecutive normal time slots form a subframe, then the length of each subframe is 1 ms. The structure of the special time slot field may be configured flexibly, that is, the lengths of the DwPTS, the GP and the UpPTS may all be configured via an upper-layer signaling, different coverage ranges may be supported, and the transmission efficiency may be increased; the specific parameters of the frame structure are as shown in Table 2.

TABLE 2

Parameters of the frame structure of the TDD system shown in FIG. 4B

| | Length of Normal Time Slot | Number of Symbols | CP Length | |
|---|---|---|---|---|
| Short CP | 15360 Ts (0.5 ms) | 7 | CP length of the First Symbol is 160 Ts (5.21 μs) | CP length of each of the other 6 Symbols is 144 Ts (4.69 μs) |
| Long CP | | 6 | 512 Ts (16.67 μs) | |

Figure 5A:
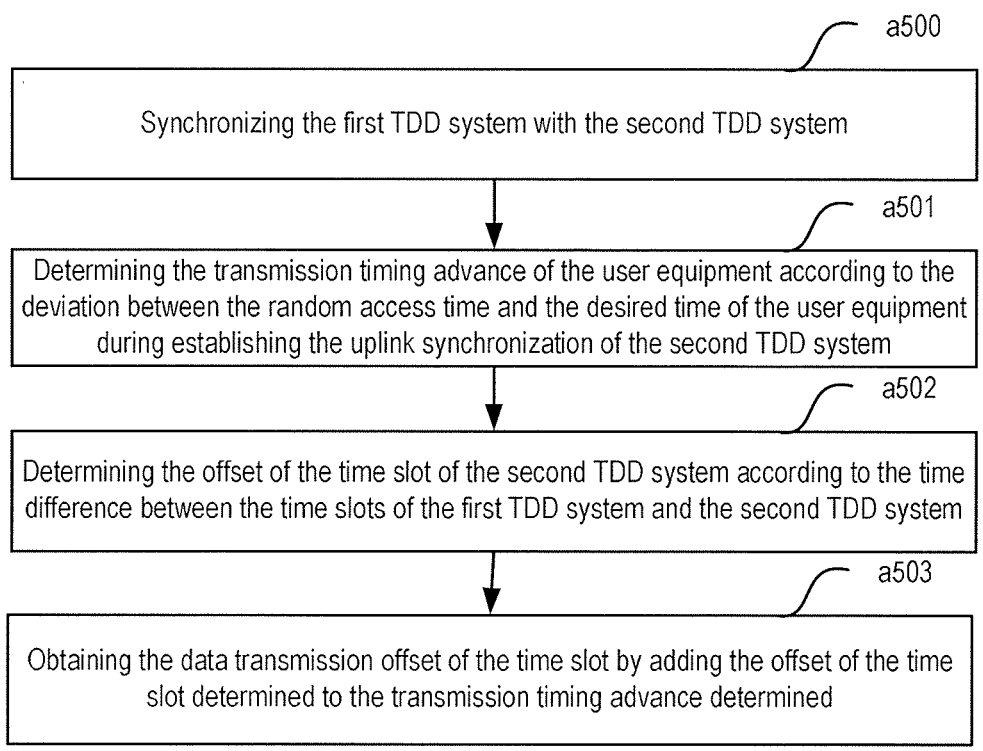
FIG. 5A is a schematic flow chart of a first method for determining a data transmission offset according to an embodiment of the invention.

As shown in FIG. 5A, a first method for determining a data transmission offset according to an embodiment of the invention includes the following processes.

In the embodiment, a first TDD system and a second TDD system are co-located in adjacent channel frequency.

Process a500: The first TDD system and the second TDD system are synchronized.

In this embodiment, the first TDD system and the second TDD system are one of the following systems respectively (without limitation):

an LTE-TDD system, a TD-SCDMA system, an HCR-TDD system and a WiMAX system, etc.

Process a500 may further include:

a timing clock and a time slot allocation ratio of the first TDD system are obtained;

starting time of the second TDD system is determined according to the timing clock obtained; and time slots of the second TDD system are allocated according to the time slot allocation ratio obtained.

There are various modes for obtaining the timing clock and the time slot allocation ratio of the first TDD system, for example:

obtaining the timing clock and the time slot allocation ratio of the first TDD system directly from a first TDD base station after being connected with the first TDD base station including the first TDD system; or sending a message for obtaining the timing clock and the time slot allocation ratio of the first TDD system to the first TDD base station including the first TDD system, and receiving the timing clock and the time slot allocation ratio of the first TDD system returned by the first TDD base station after receiving the message.

In order to guarantee that the first TDD system and the second TDD system are co-located in adjacent channel frequency, the time slots of the second TDD system are allocated according to the time slot allocation ratio of the first TDD system. In order to guarantee the accuracy of the offset determined, the starting time of the second TDD system is determined according to the timing clock of the first TDD system.

Process a501: a transmission timing advance of a user equipment is determined according to a deviation between random access time and desired time of the user equipment during establishing the uplink synchronization of the second TDD system.

Process a502: an offset of a time slot of the second TDD system is determined according to a time difference between the time slots of the first TDD system and the second TDD system.

Here, the offset of each time slot of the second TDD system needs to be determined so as to make the uplink-to-downlink switch points of the two TDD systems to align with each other, thereby avoiding the interference between two TDD systems that are co-located in adjacent channel frequency.

The modes for determining the offset of the time slot of the second TDD system include but not limited to the following three modes.

Regarding mode 1, each time slot of the second TDD system is offset by the same time, so long as the uplink-to-downlink switch points of the two TDD systems are made to align with each other. In such a mode, Process a502 may further include:

determining a first switch point between the uplink and downlink time slots of the first TDD system;

determining a second switch point between the uplink and downlink time slots of the second TDD system; and providing a time difference between the first switch point and the second switch point as the offset of each time slot of the second TDD system.

The TDD system has two types of frame structures, in one frame structure, each half-frame of 5 ms contains 7 normal time slots and 1 special time slot field; in the other frame structure, each half-frame of 5 ms contains 8 normal time slots and 1 special time slot field.

For the specific method that is applicable to the frame structure in which each half-frame of 5 ms contains 7 normal time slots and 1 special time slot field, reference may be made to the following illustrations on FIGS. 6A-6D.

For the frame structure in which each half-frame of 5 ms contains 8 normal time slots and 1 special time slot field, the offset of each time slot of the second TDD system may be determined according to Table 3.

TABLE 3

| Time Slot Allocation Ratio of the First TDD System (DL:UL) | Offset of Time Slot of the Second TDD System ΔTs (ms) |
| --- | --- |
| 1:6 | 0 |
| 2:5 | 0.675 |
| 3:4 | 0.3 |
| 4:3 | 1.025 |
| 5:2 | 0.7 |
| 6:1 | 0.375 |

Where, DL:UL represents the allocation ratio of downlink time slots to uplink time slots.

Furthermore, for the frame structure in which each half-frame of 5 ms contains 7 normal time slots and 1 special time slot field, a table may also be set, and the offset of each time slot of the second TDD system in each case is filled in the table, thus avoiding that a offset computation process is carried out each time, and saving the resources.

Regarding mode 2, each uplink time slot of the second TDD system is offset by the same time, and the offsets of other time slots of the second TDD system are zero, so as to guarantee that the uplink-to-downlink switch points of the two TDD systems are made to align with each other. In such a mode, Process a502 may further include:

determining a first switch point between the uplink and downlink time slots of the first TDD system;

determining a second switch point between the uplink and downlink time slots of the second TDD system; and providing a time difference between the first switch point and the second switch point as the offset of each uplink time slot of the second TDD system, with the offsets of other time slots of the second TDD system being zero.

For the computation of the offset of the uplink time slot of the second TDD system in mode 2, reference may be made to the following illustrations on FIGS. 8A-8D. Mode 2 is applicable to the frame structure in which each half-frame of 5 ms contains 7 normal time slots and 1 special time slot field.

Regarding mode 3, each time slot in the two TDD systems is made to align with each other, thus ensuring that the uplink-to-downlink switch points of the two TDD systems are made to align with each other, while the offset of each time slot of the second TDD system is different from each other. In such a mode, Process a502 may further include:

determining first starting points of each normal time slot and a DwPTS and a first ending point of an UpPTS of the first TDD system;

determining second starting points of each normal time slot and a DwPTS and a second ending point of an UpPTS of the second TDD system; and providing a time difference between the first starting point and the second starting point of normal time slots corresponding to the same time slot identifier as an offset of the normal time slot corresponding to the time slot identifier of the second TDD system, providing a time difference between the first starting point and the second starting point of the DwPTSs as an offset of the DwPTS of the second TDD system, and providing a time difference between the first ending point and the second ending point of the UpPTSs as an offset of the UpPTS of the second TDD system.

In mode 3, the alignment of each time slot in the two TDD systems is actually implemented by shortening the GP in the special time slot field. Such a mode is applicable to the frame structure in which each half-frame of 5 ms contains 7 normal time slots and 1 special time slot field.

For mode 3, the offset of each time slot of the second TDD system may also be computed according to specific formulae. For the specific method, reference may be made to the following illustrations on FIGS. 9A-9D.

However, when the above three modes for determining the offset of the time slot of the second TDD system are employed, the offset GP in the special time slot field of the second TDD system may not overlap the GP in the special time slot field of the first TDD system in time domain, that is, interference appears at the downlink-to-uplink switch point; in this situation, the length of at least one of the UpPTS and the DwPTS in the special time slot field of the second TDD system may be adjusted, thus the method may also include, between Process a502 and Process a503:

adjusting the length of at least one of the UpPTS and the DwPTS in the special time slot field of the second TDD system if the GP in the special time slot field of the second TDD system that has been offset according to the offset determined does not overlap the GP in the special time slot field of the first TDD system, and broadcasting the special time slot configuration information of the second TDD system that is adjusted.

In the embodiment of the invention, the length of at least one of the UpPTS and the DwPTS in the special time slot field of the second TDD system may be adjusted as required, so as to guarantee that the GP of the second TDD system that has been adjusted at least partially overlaps the GP of the first TDD system; if the GP of the second TDD system that is adjusted and the GP of the first TDD system are completely overlapped, the transmission efficiency of the system may be improved.

If further increased transmission efficiency of the system is desired, the middle time point of the GP of the second TDD system may be made to align with the middle time point of the GP of the first TDD system by adjusting the length of at least one of the UpPTS and the DwPTS of the second TDD system.

An preferred embodiment of the above mode 3 is as follows: the lengths of the UpPTS and the DwPTS of the second TDD system are both configured as the minimum length, that is, the length of the UpPTS is 133.33 μs, and the length of the DwPTS is 80.37 μs, thus ensuring that the GP of the second TDD system that has been offset at least partially overlaps the GP of the first TDD system.

Process a503: data transmission offset of the time slot is obtained by adding the offset of the time slot determined to the transmission timing advance determined.

The method may further include, between Process a500 and Process a501, transmitting a time slot allocation ratio of the first TDD system obtained to a user equipment.

The timing time of the downlink time slot may be obtained by the user equipment according to the relationship between the time slot allocation ratio and the uplink time slot.

The method may further include, after Process a503, transmitting the data transmission offset of the uplink time slot obtained to the user equipment.

Thus, the user equipment transmits data at a specified time via the uplink time slot of the second TDD system according to the data transmission offset of the uplink time slot.

The method may further include, after Process a503, transmitting data to the user equipment at a specified time via the downlink time slot of the second TDD system according to the data transmission offset of the downlink time slot obtained.

Figure 5B:
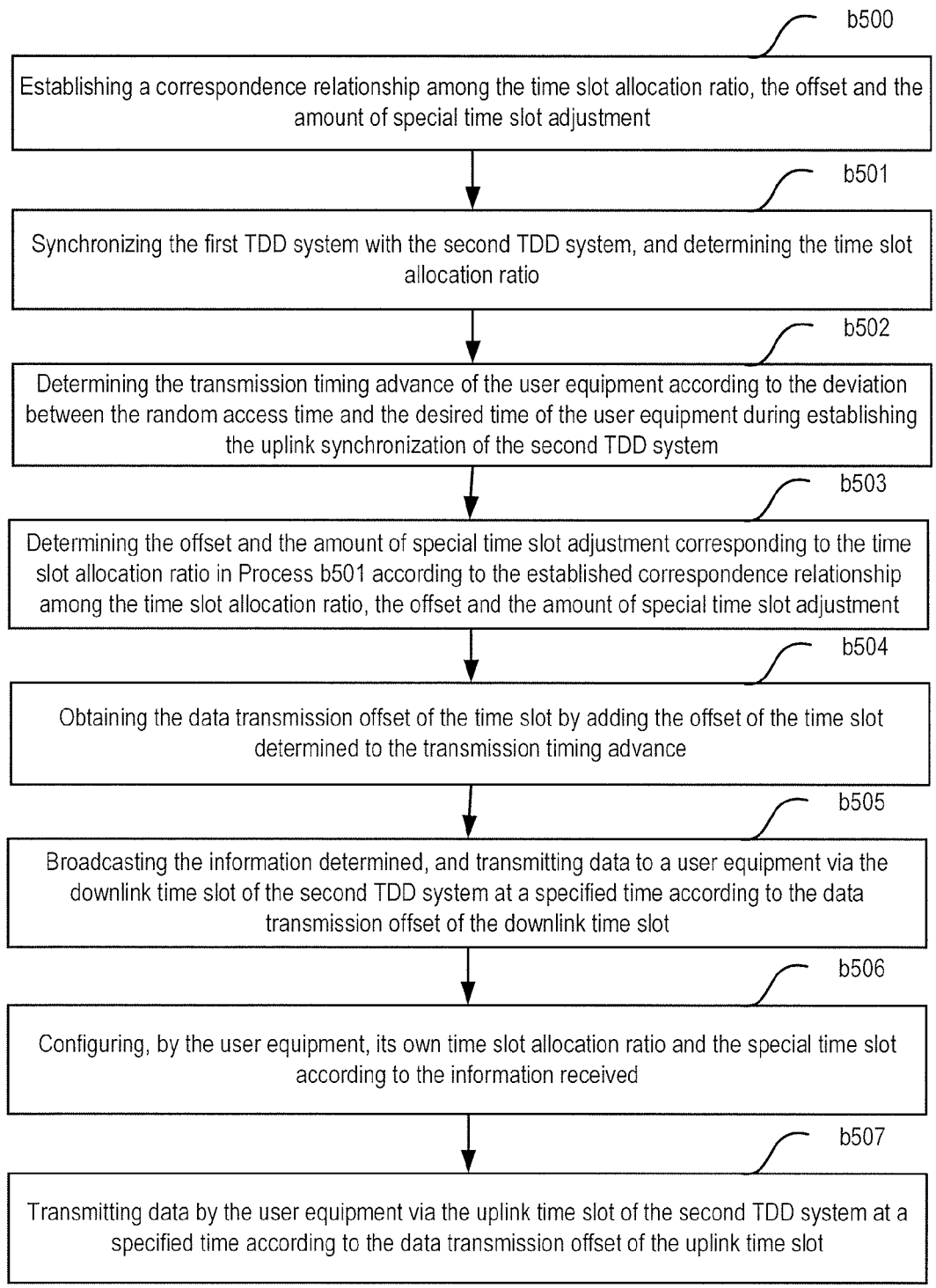
FIG. 5B is a schematic flow chart of a second method for determining a data transmission offset according to an embodiment of the invention.

As shown in FIG. 5B, a second method for determining a data transmission offset according to an embodiment of the invention includes the following processes.

Process b500: a correspondence relationship among a time slot allocation ratio, an offset and amount of special time slot adjustment is established.

Here, the offset may be determined according to the above three modes.

Process b501: a first TDD system is synchronized with a second TDD system, and a time slot allocation ratio is determined.

Process b502: a transmission timing advance of a user equipment is determined according to a deviation between random access time and desired time of the user equipment during establishing the uplink synchronization of the second TDD system.

Process b503: the offset and the amount of special time slot adjustment corresponding to the time slot allocation ratio in Process b501 is determined according to the established correspondence relationship among the time slot allocation ratio, the offset and the amount of special time slot adjustment.

Process b504: a data transmission offset of the time slot is obtained by adding the offset of the time slot determined to the transmission timing advance determined.

Process b505: the time slot allocation ratio, the amount of special time slot adjustment and the data transmission offset of the uplink time slot is broadcasted, and data is transmitted to a user equipment via the downlink time slot of the second TDD system at a specified time according to an obtained data transmission offset of the downlink time slot.

Process b506: the user equipment configures its own time slot allocation ratio and special time slot field according to the time slot allocation ratio and the information of amount of special time slot adjustment received.

Process b507: the user equipment transmits data via the uplink time slot of the second TDD system at a specified time according to the data transmission offset of the uplink time slot received.

The invention will now be illustrated by taking a TD-SCDMA system as the first TDD system and taking an LTE-TDD system as the second TDD system. However, the invention is not limited to the TD-SCDMA system and the LTE-TDD system, and the invention may be applicable to any TDD system.

Figure 6A:
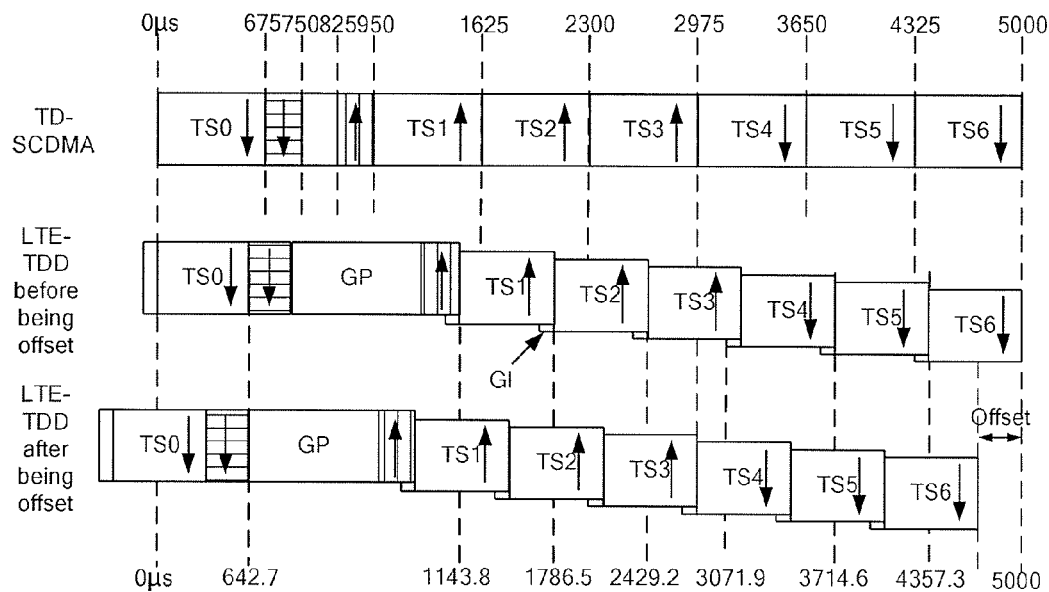
FIG. 6A is a schematic diagram of a first frame structure when the offset of each time slot is the same according to an embodiment of the invention.

As shown in FIG. 6A, in the schematic diagram of the first frame structure when the offset of each time slot is the same according to an embodiment of the invention, if the GI part of each normal time slot is the same, the following formula (1) may be employed to determine the offset of each time slot:

$$S=(6-i)\times T \tag{1}$$

Where, S denotes the offset of each time slot (each half-frame of 5 ms contains 7 normal time slots and 1 special time slot field, and the offset of each time slot is the same); the uplink-to-downlink switch point lies between the $i^{th}$ normal time slot and the $(i+1)^{th}$ normal time slot ($1 \leq i \leq 5$); and T is the length of the GI part in each normal time slot.

For example, the uplink-to-downlink switch point lies between the $3^{rd}$ time slot and the $4^{th}$ time slot, and the length of the GI part is 32.29 μs.

In FIG. 6A, the location of the half-frame structure of the LTE-TDD system before being offset is the location after being synchronized with the TD-SCDMA system; because the GI part of each time slot lies in front of the data part of the time slot and the GI part of time slot TS0 overlaps the data part of the adjacent time slot, the GI part of time slot TS0 in the LTE-TDD system is not aligned with the time slot TS0 in the TD-SCDMA system.

The offset of each time slot of the LTE-TDD system computed via the formula (1) is 3×32.29 μs=96.87 μs.

For the LTE-TDD system that is offset according to the offset computed, its uplink-to-downlink switch point is aligned with the uplink-to-downlink switch point of the TD-SCDMA system.

During the specific implementing process, the uplink-to-downlink switch points of the two TDD systems are made to align with each other by transmitting data in advance by a certain time.

Figure 6B:
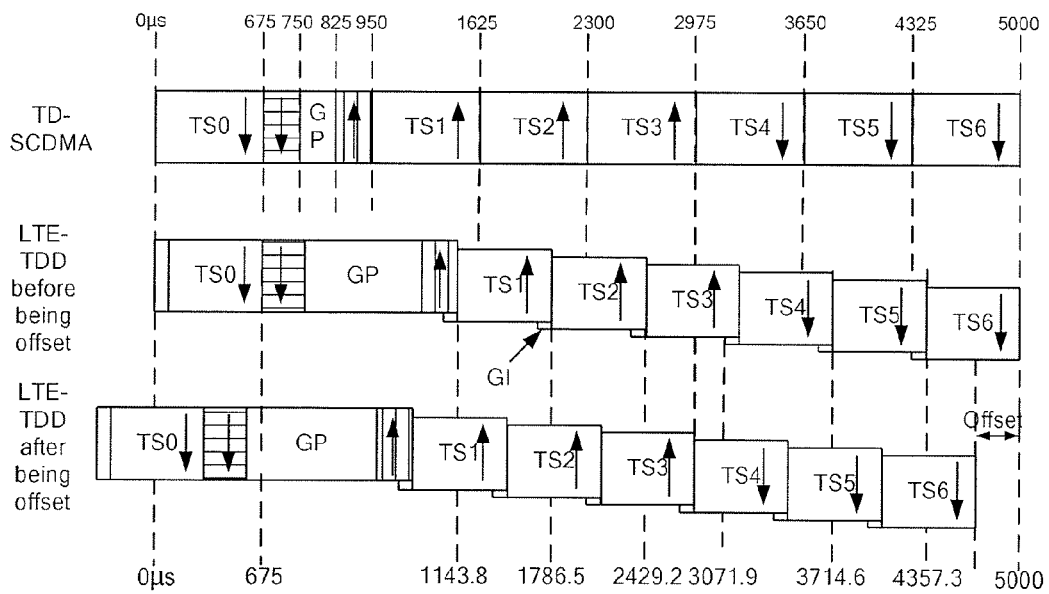
FIG. 6B is a schematic diagram of a second frame structure when the offset of each time slot is the same according to an embodiment of the invention.

For the case that the GI part of each time slot lies in front of the data part of the time slot, the GI part of time slot TS0 may not overlap the data part of the adjacent time slot, as shown in FIG. 6B, in the schematic diagram of the second frame structure when the offset of each time slot is the same according to an embodiment of the invention, the GI part of each time slot lies in front of the data part of the time slot, and the GI part of time slot TS0 does not overlap the data part of the adjacent time slot; in this situation, the GI part of TS0 in the LTE-TDD system before being offset is made to align with the time slot TS0 in the TD-SCDMA system by shortening the length of the GP in the special time slot field.

The specific computation of the offset is similar to the above illustration on FIG. 6A, so it is omitted here.

Figure 6C:
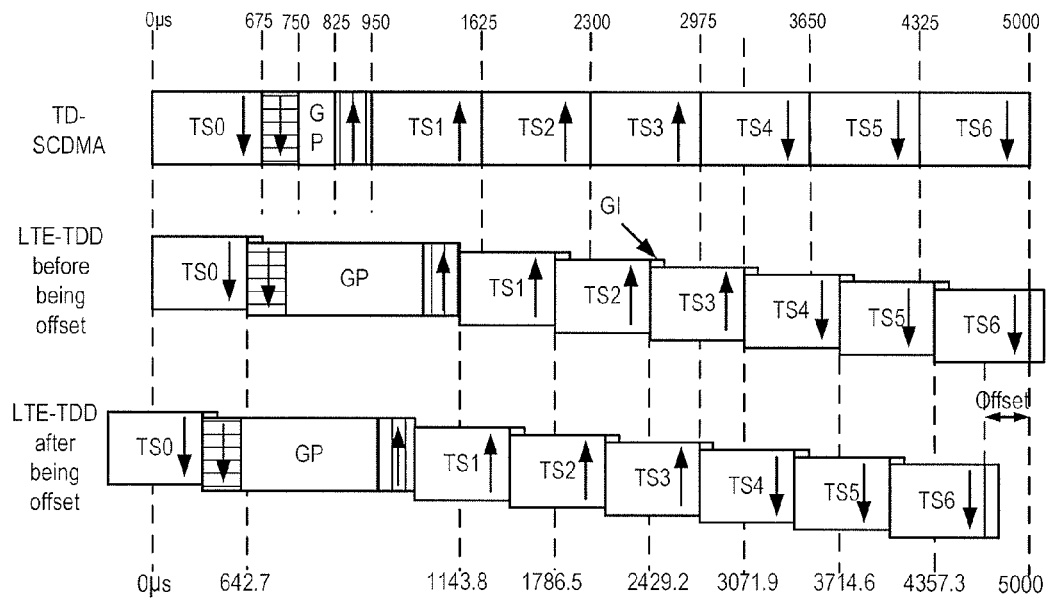
FIG. 6C is a schematic diagram of a third frame structure when the offset of each time slot is the same according to an embodiment of the invention.
Figure 6D:
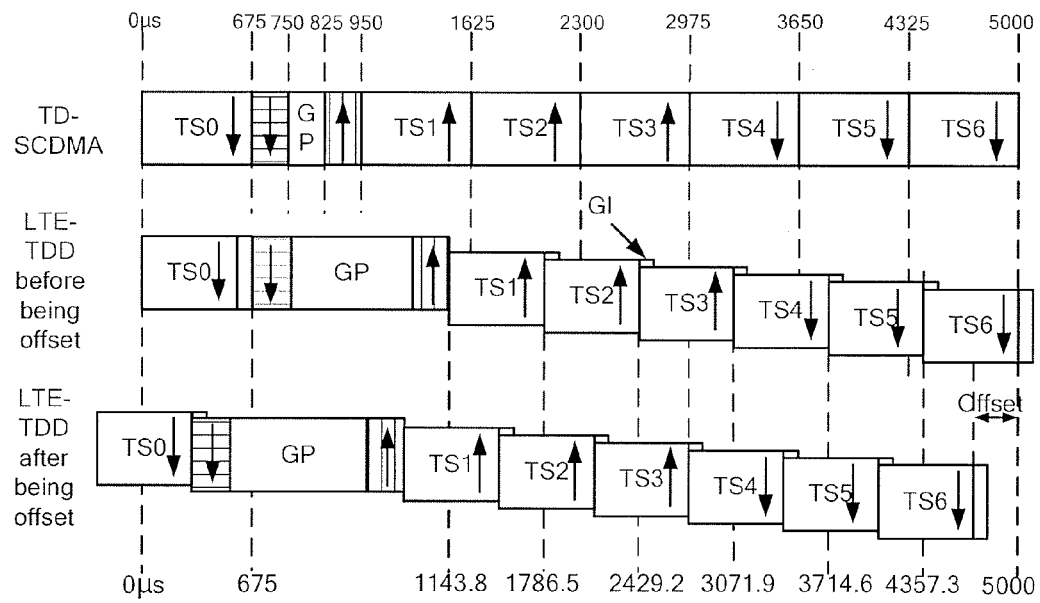
FIG. 6D is a schematic diagram of a fourth frame structure when the offset of each time slot is the same according to an embodiment of the invention.

There are also two types of frame structures in which the GI part of each time slot lies behind the data part of the time slot, as shown in FIGS. 6C and 6D. A schematic diagram of the third frame structure in which the offset of each time slot is the same according to an embodiment of the invention is as shown in FIG. 6C, where the GI part of each time slot lies behind the data part of the time slot, and the GI part of time slot TS0 overlaps the data part of the adjacent time slot, thus time slot TS0 in the LTE-TDD system before being offset is aligned with time slot TS0 in the TD-SCDMA system, while the GI part of time slot TS6 in the LTE-TDD system is not aligned with time slot TS6 in the TD-SCDMA system.

The specific computation of the offset is similar to the above illustration on FIG. 6A, so it is omitted here.

The frame structure in which the GI part of each time slot lies behind the data part of the time slot and the GI part of time slot TS0 does not overlap the data part of the adjacent time slot is as shown in FIG. 6D, and in the schematic diagram of the fourth frame structure in which the offset of each time slot is the same according to an embodiment of the invention, the GI part of each time slot lies behind the data part of the time slot, and the GI part of time slot TS0 does not overlap the data part of the adjacent time slot; the length of the GP in the special time slot field needs to be shortened so as to make time slot TS0 in the LTE-TDD system before being offset to align with time slot TS0 in the TD-SCDMA system and to make other parts (except for the GI part) of the TS6 in the LTE-TDD system to align with time slot TS6 in the TD-SCDMA system.

The specific computation of the offset is similar to the above illustration on FIG. 6A, so it is omitted here.

If the GI part of each normal time slot is not equal to each other, that is, $T_i \neq T_j$ ($0 \leq i \leq 6$, $0 \leq j \leq 6$), there exist the following two processing methods for the situations shown in FIGS. 6A-6D.

Method 1: T in the above formula (1) is the length of the shortest GI part among all GI parts of normal time slots;

Method 2: The following formula (2) is employed to determine the offset of each time slot:

$$S = T_i + T_{i+1} + T_{i+2} \tag{2}$$

Where, the uplink-to-downlink switch point lies between the $i^{th}$ normal time slot and the $(i+1)^{th}$ normal time slot ($1 \leq i \leq 5$); and $T_i$ is the length of the GI part of the $i^{th}$ normal time slot.

Figure 7:
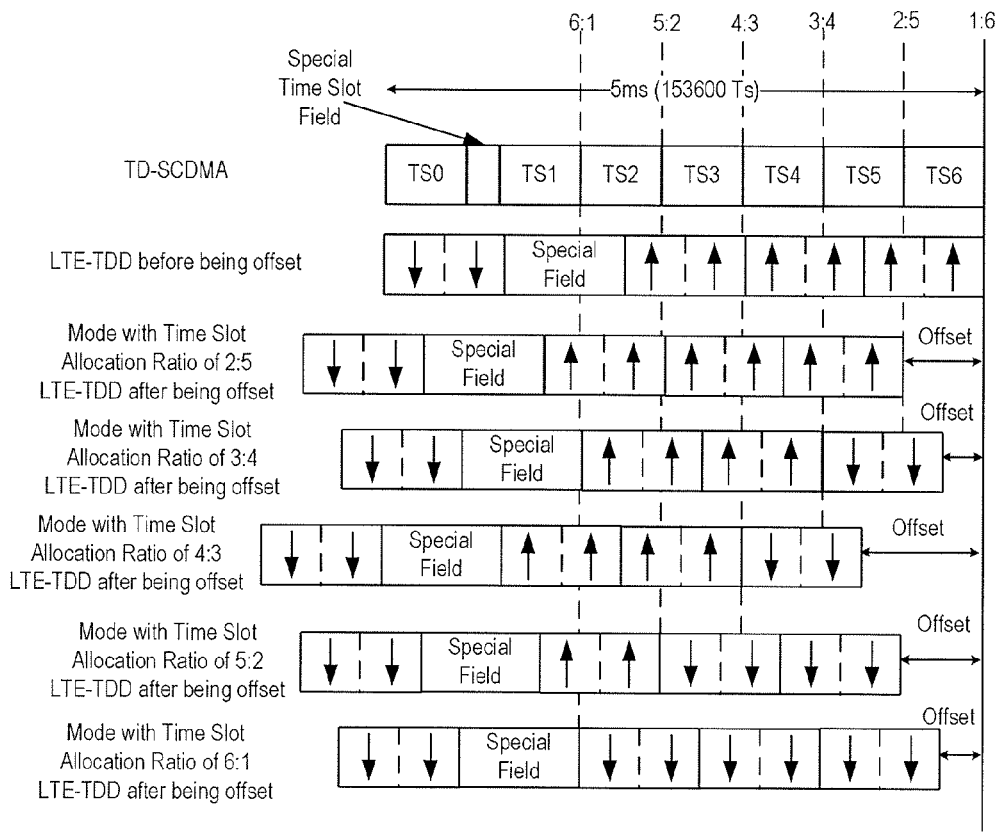
FIG. 7 is a schematic diagram of a fifth frame structure when the offset of each time slot is the same according to an embodiment of the invention.
Figure 8A:
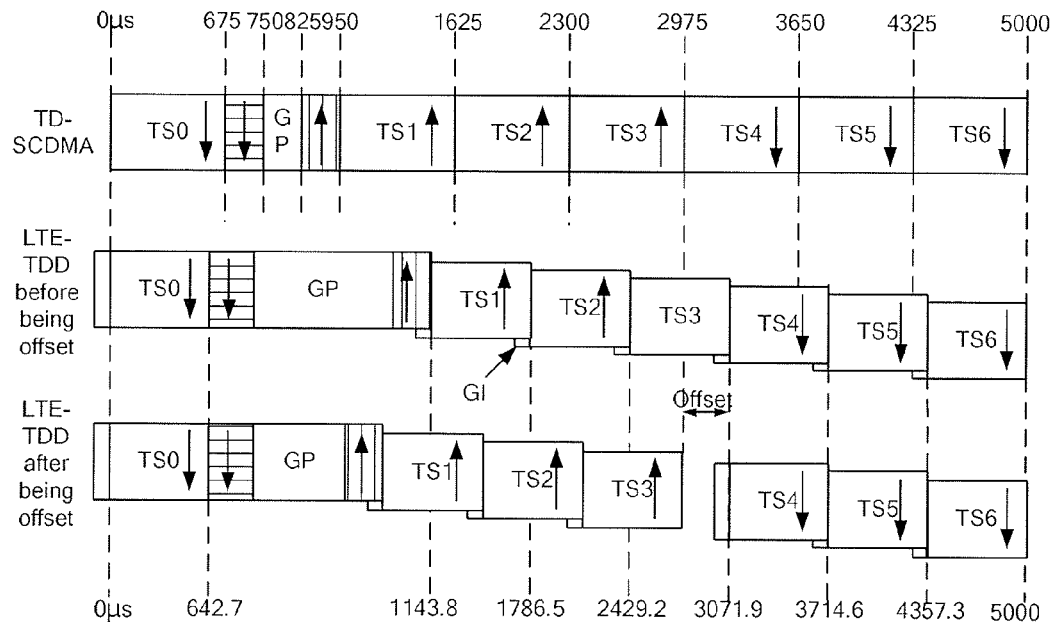
FIG. 8A is a schematic diagram of a first frame structure when the offset of each uplink time slot is the same according to an embodiment of the invention.
Figure 8B:
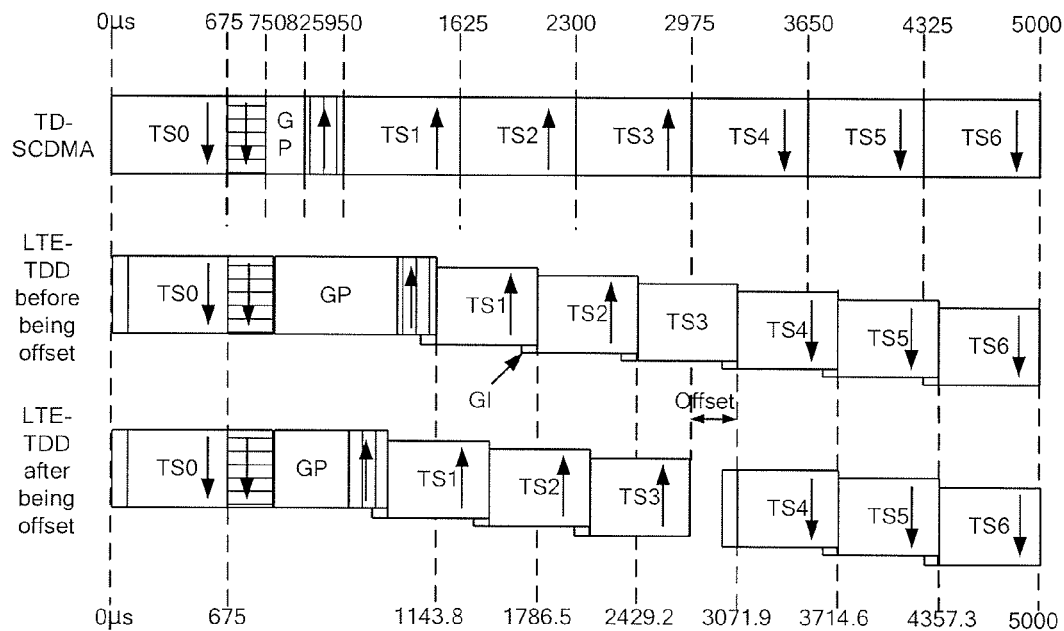
FIG. 8B is a schematic diagram of a second frame structure when the offset of each uplink time slot is the same according to an embodiment of the invention.
Figure 8C:
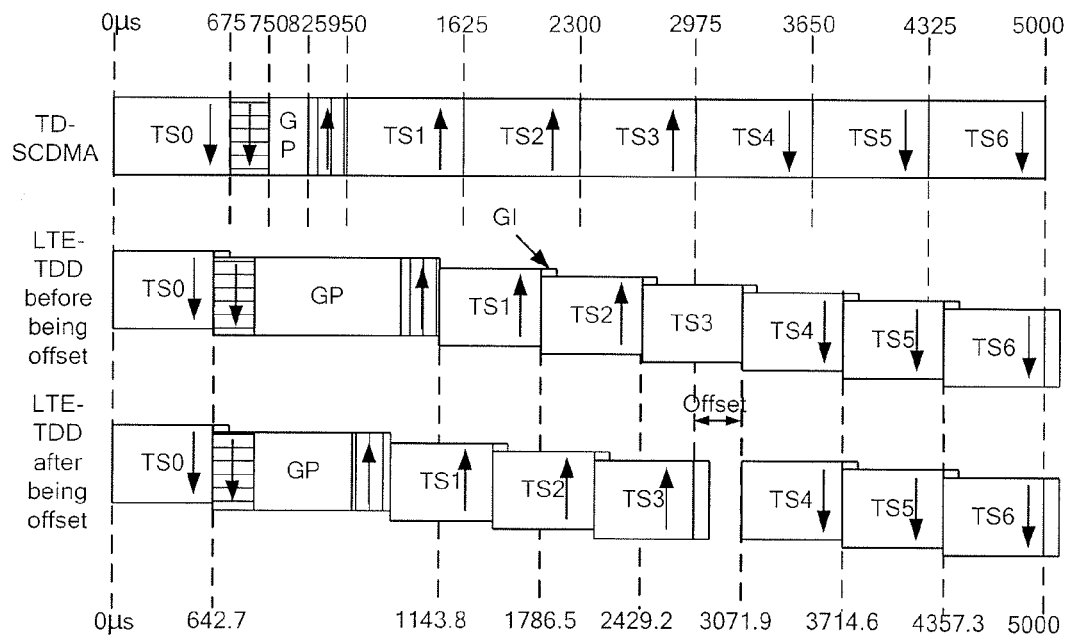
FIG. 8C is a schematic diagram of a third frame structure when the offset of each uplink time slot is the same according to an embodiment of the invention.
Figure 8D:
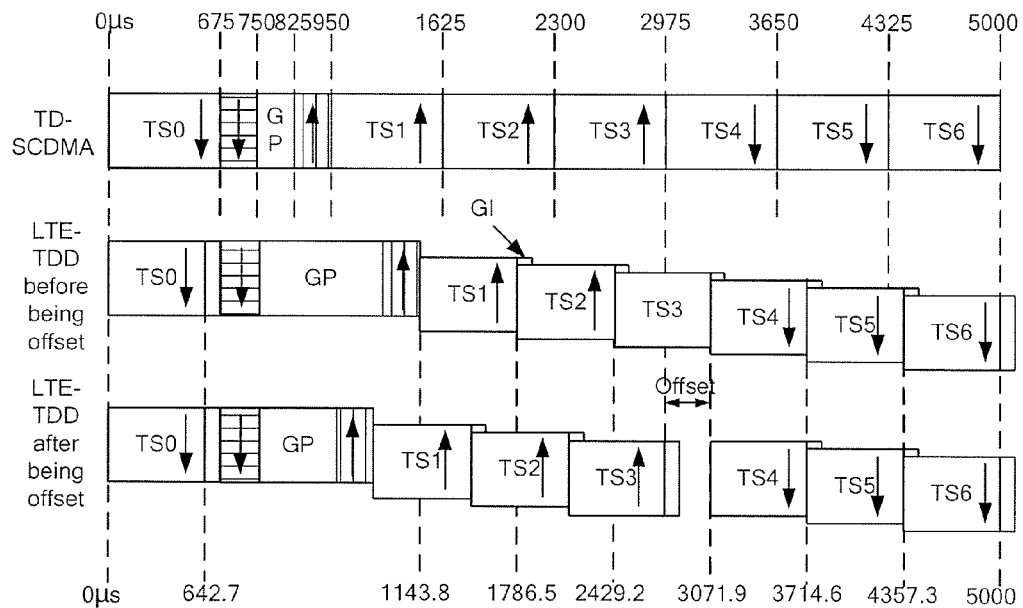
FIG. 8D is a schematic diagram of a fourth frame structure when the offset of each uplink time slot is the same according to an embodiment of the invention.

For the frame structure in which each half-frame of 5 ms contains 8 normal time slots and 1 special time slot field, it may be realized according to the offsets of the time slots determined according to Table 3, and its realization process is as shown in FIG. 7; in the schematic diagram of the fifth frame structure in which the offset of each time slot is the same according to an embodiment of the invention, the LTE-TDD system before being offset and the TD-SCDMA system are aligned with each other end to end, and the offsets for different time slot allocation ratios may be obtained via Table 3.

It may be seen from FIG. 7 that the uplink-to-downlink switch point of the LTE-TDD system after being offset is aligned with the uplink-to-downlink switch point of the TD-SCDMA system.

In FIGS. 6A-6D, the same offset is employed by each time slot of the LTE-TDD system. In an embodiment of the invention, only the uplink time slots of the LTE-TDD system employ the offset computed via a method which is the same as the above illustration of FIGS. 6A-6D, while the offsets of other time slots are zero, thus ensuring that the uplink-to-downlink switch points of the two TDD systems are made to align with each other, referring to FIGS. 8A-8D, and the specific implementing methods are similar to those of FIGS. 6A-6D respectively, so it is omitted here.

Figure 9A:
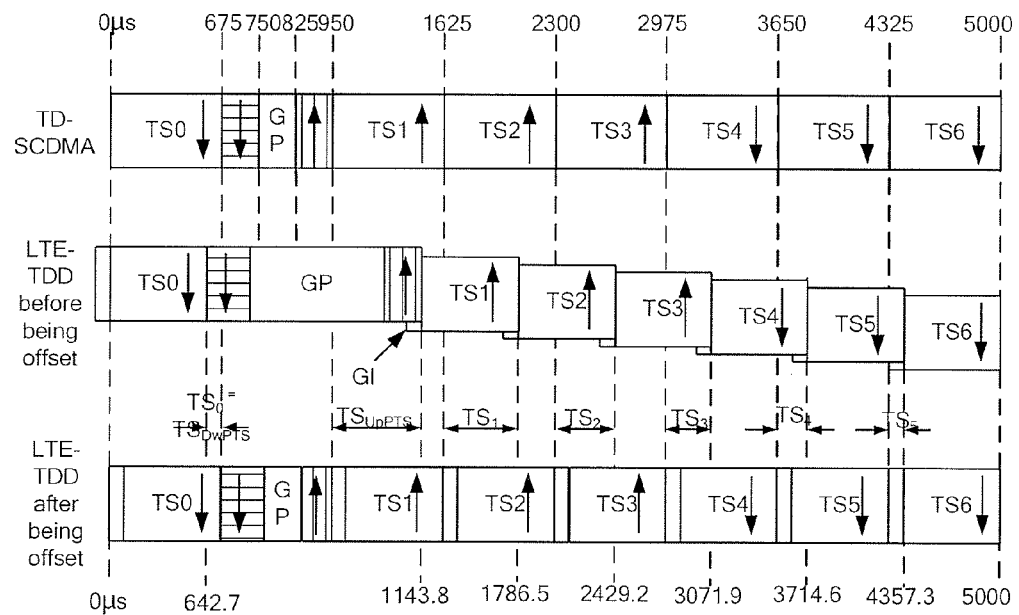
FIG. 9A is a schematic diagram of a first frame structure when the offset of each time slot is different from each other according to an embodiment of the invention.

There exists another offset mode according to an embodiment of the invention, that is, the offset of each time slot is different from each other, as shown in FIG. 9A; in the schematic diagram of the first frame structure in which the offset of each time slot is different from each other according to an embodiment of the invention, the GI part of each time slot lies in front of the data part of the time slot, the GI part of time slot TS0 overlaps the data part of the adjacent time slot, and the location of the half-frame structure of the LTE-TDD system before being offset shown in FIG. 9A is the location after being synchronized with the TD-SCDMA system; because the GI part of each time slot lies in front of the data part of the time slot and the GI part of time slot TS0 overlaps the data part of the adjacent time slot, the GI part of time slot TS0 in the LTE-TDD system is not aligned with the time slot ISO in the TD-SCDMA system.

If the length of the GI part of each normal time slot is the same as each other, the formula (3) for computing the offset of each normal time slot is:

$$TS_i = (6-i) \times T \tag{3}$$

Where, $TS_i$ denotes the offset of the $i^{th}$ normal time slot; the uplink-to-downlink switch point lies between the $i^{th}$ normal time slot and the $(i+1)^{th}$ normal time slot ($1 \leq i \leq 5$); and T is the length of the GI part in each normal time slot.

The formula (4) for computing the offset of the uplink pilot time slot in the special time slot field is:

$$TS_{UpPTS} = 6 \times T \tag{4}$$

The offset of the downlink pilot time slot in the special time slot is the same as the offset of time slot TS0, which is represented via formula (5) as:

$$TS_0 = TS_{DwPTS} = -T \text{(a negative value means a lag of the time slot)} \tag{5}$$

According to the time slot allocation ratio shown in FIG. 9A, the offset of each time slot is computed via the above formulae (3), (4) and (5):

$TS_0 = TS_{DwPTS} = -32.29$ μs, $TS_{UpPTS} = 6 \times 32.29$ μs $= 193.74$ μs, $TS_1 = 5 \times 32.29$ μs $= 161.45$ μs, $TS_2 = 4 \times 32.29$ μs $= 129.16$ μs, $TS_3 = 3 \times 32.29$ μs $= 96.87$ μs, $TS_4 = 2 \times 32.29$ μs $= 64.58$ μs, $TS_5 = 1 \times 32.29$ μs $= 32.29$ μs, and $TS_6 = 0 \times 32.29$ μs $= 0$.

After each time slot is offset according to the corresponding offset, each time slot in the LTE-TDD system is aligned with the corresponding time slot in the TD-SCDMA system, that is, the uplink-to-downlink switch points in the two TDD systems are aligned with each other.

Figure 9B:
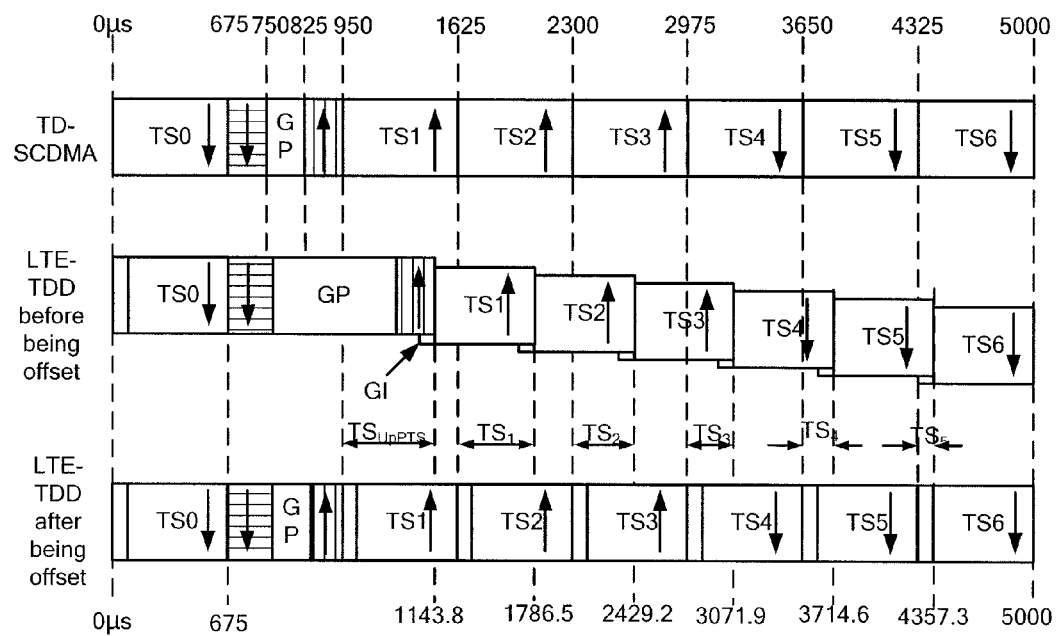
FIG. 9B a schematic diagram of a second frame structure when the offset of each time slot is different from each other according to an embodiment of the invention.

For the frame structure in which the GI part of each time slot lies in front of the data part of the time slot and the GI part of time slot TS0 does not overlap the data part of the adjacent time slot, as shown in FIG. 9B, in the schematic diagram of the second frame structure in which the offset of each time slot is different from each other according to an embodiment of the invention, because the GI part of each time slot lies in front of the data part of the time slot and the GI part of time slot TS0 does not overlap the data part of the adjacent time slot, the GI part of time slot TS0 in the LTE-TDD system before being offset is made to align with time slot TS0 in the TD-SCDMA system by shortening the length of the GP in the special time slot field.

The formula for computing the offsets of time slots TS1-TS6 in the normal time slots and the offset of the uplink pilot time slot in the special time slot filed is the same as the formula for computing the offsets of time slots TS1-TS6 in the normal time slots and the offset of the uplink pilot time slot in the special time slot field in FIG. 9A, so it is omitted here.

The offsets of time slot TS0 and the downlink pilot time slot are:

$$TS_0 = TS_{DwPTS} = 0 \text{(i.e., no offset is needed)}$$

Figure 9C:
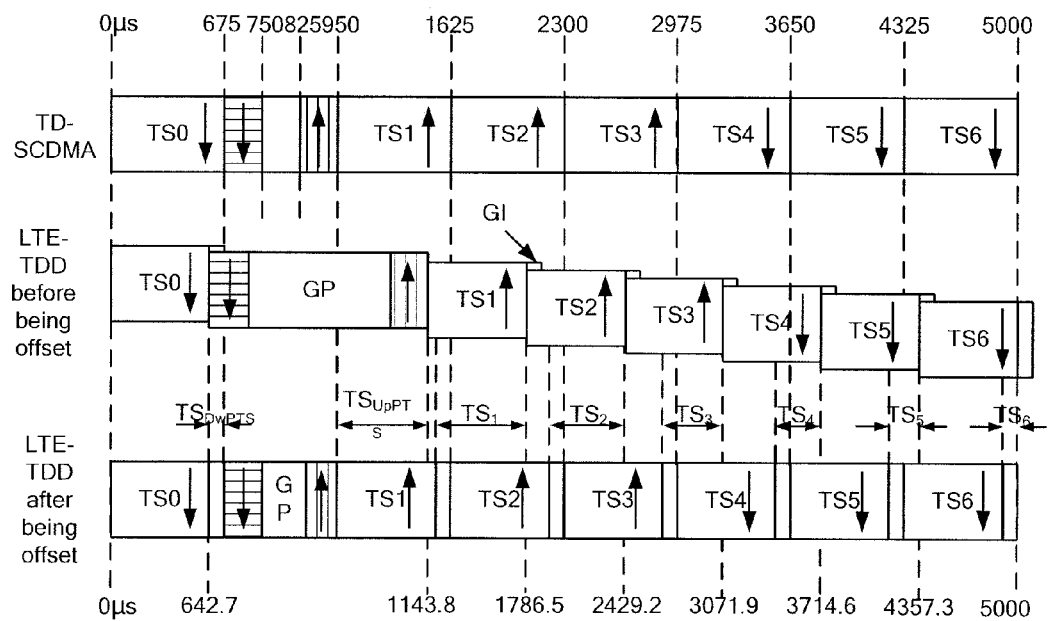
FIG. 9C is a schematic diagram of a third frame structure when the offset of each time slot is different from each other according to an embodiment of the invention.
Figure 9D:
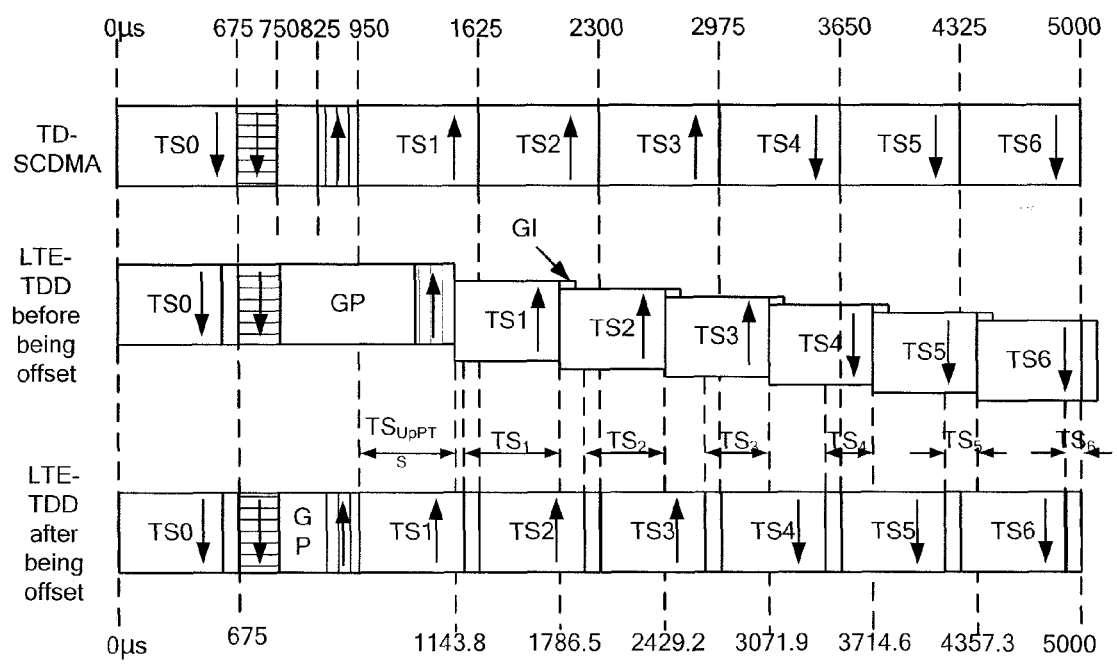
FIG. 9D is a schematic diagram of a fourth frame structure when the offset of each time slot is different from each other according to an embodiment of the invention.

There are also two types of frame structures in which the GI part of each time slot lies behind the data part of the time slot, as shown in FIGS. 9C and 9D, the third frame structure in which the offset of each time slot is different from each other according to an embodiment of the invention is as shown in FIG. 9C, where the GI part of each time slot lies behind the data part of the time slot and the GI part of time slot TS0 overlaps the data part of the adjacent time slot, thus time slot TS0 in the LTE-TDD system before being offset is aligned with time slot TS0 in the TD-SCDMA system, while the GI part of time slot TS6 in the LTE-TDD system is not aligned with time slot TS6 in the TD-SCDMA system.

The formula (6) for computing the offset of each normal time slot is:

$$TS_i = (6+1-i) \times T \qquad (6)$$

Where, $TS_i$ denotes the offset of the $i^{th}$ normal time slot; the uplink-to-downlink switch point lies between the $i^{th}$ normal time slot and the $(i+1)^{th}$ normal time slot ($1 \leq i \leq 5$); and T is the length of the GI part in each normal time slot.

The formula (7) for computing the offset of the uplink pilot time slot in the special time slot field is:

$$TS_{UpPTS} = (6+1) \times T \qquad (7)$$

The offset of time slot TS0 is:

$$TS_0 = 0$$

The offset of the downlink pilot time slot in the special time slot field is:

$$TS_{DwPTS} = -T \text{(a negative value means a delay of the time slot)}$$

The offset of each time slot is computed via the above formulae according to the time slot allocation ratio shown in FIG. 9C:

$$TS_0 = 0, TS_{DwPTS} = -32.29 \text{ μs}, TS_{UpPTS} = 7 \times 32.29 \text{ μs} = 226.03 \text{ μs}, TS_1 = 6 \times 32.29 \text{ μs} = 193.74 \text{ μs},$$

$$TS_2 = 5 \times 32.29 \text{ μs} = 161.45 \text{ μs}, TS_3 = 4 \times 32.29 \text{ μs} = 129.16 \text{ μs}, TS_4 = 3 \times 32.29 \text{ μs} = 96.87 \text{ μs},$$

$$TS_5 = 2 \times 32.29 \text{ μs} = 64.58 \text{ μs}, TS_6 = 1 \times 32.29 \text{ μs} = 32.29 \text{ μs}.$$

After each time slot is offset according to the corresponding offset, each time slot in the LTE-TDD system is aligned with the corresponding time slot in the TD-SCDMA system, that is, the uplink-to-downlink switch points in the two TDD systems are aligned with each other.

For the frame structure in which the GI part of each time slot lies behind the data part of the time slot and the GI part of time slot TS0 does not overlap the data part of the adjacent time slot, as shown in FIG. 9D, in the schematic diagram of the fourth frame structure in which the offset of each time slot is different from each other according to an embodiment of the invention, the GI part of each time slot lies behind the data part of the time slot and the GI part of time slot TS0 does not overlap the data part of the adjacent time slot, and the length of the GP in the special time slot field needs to be shortened so as to make time slot TS0 in the LTE-TDD system before being offset to align with time slot TS0 in the TD-SCDMA system and to make other parts (except for the GI part) of time slot TS6 in the LTE-TDD system to align with time slot TS6 in the TD-SCDMA system.

The formula for computing the offsets of time slots TS1-TS6 in the normal time slots and the offset of the uplink pilot time slot in the special time slot field is the same as the formula for computing the offsets of time slots TS1-TS6 in the normal time slots and the offset of the uplink pilot time slot in the special time slot field in FIG. 9C, so it is omitted here.

The offsets of time slot TS0 and the downlink pilot time slot are:

$$TS_0 = TS_{DwPTS} = 0 \text{(i.e., no offset is needed)}$$

It may be seen from FIGS. 9A-9D that each time slot in the two TDD systems is aligned with each other by shortening the length of the GP in the special time slot field, thereby eliminating the interference between two TDD systems that are co-located in adjacent channel frequency.

If the GI part of each normal time slot is unequal, that is, $T_i \neq T_j$ ($0 \leq i \leq 6$, $0 \leq j \leq 6$), there exist the following two processing methods for the situations shown in FIGS. 9A-9D.

Method 1: T in the above formula is the length of the shortest GI part among all GI parts of normal time slots;

Method 2: The following formulae may be employed to compute the offset of each time slot in FIG. 9A:

$$TS_6 = 0$$

$$TS_5 = T_6$$

$$TS_4 = T_6 + T_5$$

$$TS_3 = T_6 + T_5 + T_4$$

$$TS_2 = T_6 + T_5 + T_4 + T_3$$

$$TS_1 = T_6 + T_5 + T_4 + T_3 + T_2$$

$$TS_{UpPTS} = T_6 + T_5 + T_4 + T_3 + T_2 + T_1$$

$$TS_0 = TS_{DwPTS} = -T_0$$

Where, $TS_i$ denotes the offset of the $i^{th}$ normal time slot; $T_i$ is the length of the GI part of the $i^{th}$ normal time slot.

The offsets of $TS_1$ to $TS_6$ and the uplink pilot time slot in FIG. 9B may also be computed via the above formulae for computing the offsets of $TS_1$ to $TS_6$ and the uplink pilot time slot in FIG. 9A, and the offsets of time slot TS0 and the downlink pilot time slot may be computed via the following formula:

$$TS_0 = TS_{DwPTS} = 0$$

The following formulae may be employed to compute the offset of each time slot in FIG. 9C:

$$TS_6 = T_6$$

$$TS_5 = T_6 + T_5$$

$$TS_4 = T_6 + T_5 + T_4$$

$$TS_3 = T_6 + T_5 + T_4 + T_3$$

$$TS_2 = T_6 + T_5 + T_4 + T_3 + T_2$$

$$TS_1 = T_6 + T_5 + T_4 + T_3 + T_2 + T_1$$

$$TS_{UpPTS} = T_6 + T_5 + T_4 + T_3 + T_2 + T_1$$

$$TS_0 = 0$$

$$TS_{DwPTS} = -T_0$$

Where, $TS_i$ denotes the offset of the $i^{th}$ normal time slot; and $T_i$ denotes the length of the GI part of the $i^{th}$ normal time slot.

The offsets of $TS_0$ to $TS_6$ and the uplink pilot time slot in FIG. 9D may also be computed by employing the above formulae for computing the offsets of $TS_0$ to $TS_6$ and the uplink pilot time slot in FIG. 9C, while the following formula is employed to compute the offset of the downlink pilot time slot:

$$TS_{DwPTS}=0$$

For the situations shown in FIGS. 6A-9D, the GP in the LTE-TDD system after being offset may not overlap the GP in the TD-SCDMA system in the time domain, that is, there exists no overlapped part, thus the length of at least one of the UpPTS and the DwPTS in the LTE-TDD system is adjusted so that the GP in the LTE-TDD system after being offset at least partially overlaps the GP in the TD-SCDMA system in the time domain.

The mode for adjusting the length of at least one of the UpPTS and the DwPTS in the LTE-TDD system is very flexibly, so long as the GP in the LTE-TDD system after being offset overlaps the GP in the TD-SCDMA system in the time domain.

There exists a preferred adjustment mode for the situations shown in FIGS. 9A-9D: the lengths of the UpPTS and the DwPTS are both configured as the minimum length, that is, the length of the UpPTS is 133.33 μs, and the length of the DwPTS is 80.37 μs, thus the GP in the LTE-TDD system after being adjusted overlaps the GP in the TD-SCDMA system.

In the embodiments of the invention, a first TDD system is synchronized with a second TDD system, a transmission timing advance of a user equipment is determined according to a deviation between random access time and desired time of the user equipment during establishing the uplink synchronization of the second TDD system, an offset of a time slot of the second TDD system is determined according to a time difference between the time slots of the first TDD system and the second TDD system, and a data transmission offset of the time slot is obtained by adding the offset of the time slot determined to the transmission timing advance, thus ensuring that the uplink-to-downlink switch points of the two TDD systems are aligned with each other, thereby the interference between two TDD systems that are co-located in adjacent channel frequency can be eliminated, and the utilization of the system can be improved.

Finally, it should be noted that the above embodiments are used for illustrating the technical solutions of the invention without limitation. Although the invention has been described in detail in conjunction with the preferred embodiments, it should be understood by those skilled in the art that various modifications or equivalent substitutions can be made without departing from the scope and spirit of the invention.

The invention claimed is:

1. A method for determining an offset of a time slot, comprising:
synchronizing a first TDD system with a second TDD system; and determining an offset of a time slot of the second TDD system according to a time difference between time slots of the first TDD system and the second TDD system,
wherein, determining the offset of the time slot of the second TDD system according to the time difference between the time slots of the first TDD system and the second TDD system comprises:
determining a first switch point between uplink and downlink time slots of the first TDD system;
determining a second switch point between uplink and downlink time slots of the second TDD system; and
providing a time difference between the first switch point and the second switch point as the offset of each time slot of the second TDD system;
wherein, the method further comprises, after determining the offset of the time slot of the second TDD system according to the time difference between the time slots of the first TDD system and second TDD system:
adjusting the length of at least one of an UpPTS and a DwPTS in a special time slot field of the second TDD system if a GP in the special time slot field of the second TDD system after being offset does not overlap a GP in a special time slot field of the first TDD system, and broadcasting special time slot configuration information of the second TDD system after being adjusted.

2. The method of claim 1, wherein, synchronizing a first TDD system with a second TDD system comprises:
obtaining a timing clock and a time slot allocation ratio of the first TDD system;
determining starting time of the second TDD system according to the timing clock; and
allocating the time slots of the second TDD system according to the time slot allocation ratio.

3. The method of claim 2, wherein, obtaining a timing clock and a time slot allocation ratio of the first TDD system comprises:
obtaining the timing clock and the time slot allocation ratio of the first TDD system directly from a first TDD base station including the first TDD system; or
sending a message for obtaining the timing clock and the time slot allocation ratio of the first TDD system to a first TDD base station including the first TDD system, and receiving the timing clock and the time slot allocation ratio of the first TDD system returned by the first TDD base station after receiving the message.

4. The method of claim 1, further comprising:
determining a transmission timing advance of a user equipment according to a deviation between random access time and desired time of the user equipment during establishing the uplink synchronization of the second TDD system; and
obtaining a data transmission offset of the time slot by adding the determined offset of the time slot to the determined transmission timing advance.

5. A system for determining an offset of a time slot, comprising: a first TDD base station including a first TDD system, wherein, the system for determining an offset of a time slot further comprises:
a second TDD base station including a second TDD system, adapted to synchronize the first TDD system with the second TDD system, and determine an offset of a time slot of the second TDD system according to a time difference between time slots of the first TDD system and the second TDD system,
wherein, the second TDD base station comprises:
a matching module, adapted to synchronize the first TDD system with the second TDD system; and
an offset determination module, adapted to determine the offset of the time slot of the second TDD system according to the time difference between the time slots of the first TDD system and the second TDD system,
wherein, the offset determination module comprises:
a first switch point determination module, adapted to determine a first switch point between the uplink and downlink time slots of the first TDD system;

a second switch point determination module, adapted to determine a second switch point between the uplink and downlink time slots of the second TDD system; and a first processing module, adapted to provide a time difference between the first switch point and the second switch point as the offset of each time slot of the second TDD system, wherein, the second TDD base station further comprises:

a comparison module, adapted to perform an adjustment for adjusting the length of at least one of an UpPTS and a DwPTS in a special time slot field of the second TDD system if a GP in the special time slot field of the second TDD system after being offset does not overlap a GP in a special time slot field of the first TDD system; and a broadcast module, adapted to broadcast special time slot configuration information of the second TDD system after the adjustment.

6. The system for determining an offset of a time slot of claim 5, wherein, the matching module comprises:

an obtaining module, adapted to obtain a timing clock and a time slot allocation ratio of the first TDD system; and an allocation module, adapted to determine starting time of the second TDD system according to the timing clock and allocate the time slots of the second TDD system according to the time slot allocation ratio.

7. The system for determining an offset of a time slot of claim 6, wherein, the obtaining module is further adapted to obtain the timing clock and the time slot allocation ratio of the first TDD system directly from the first TDD base station; or the obtaining module is further adapted to send a message for obtaining the timing clock and the time slot allocation ratio of the first TDD system to the first TDD base station and receive the timing clock and the time slot allocation ratio of the first TDD system returned by the first TDD base station after receiving the message.

8. The system for determining an offset of a time slot of claim 5, wherein, the second TDD base station further comprises:

an advance determination module, adapted to determine a transmission timing advance of a user equipment according to a deviation between random access time and desired time of the user equipment during establishing the uplink synchronization of the second TDD system; and a computing module, adapted to obtain a data transmission offset of the time slot by adding the determined offset of the time slot to the determined transmission timing advance.

9. A base station, comprising:

a matching module, adapted to synchronize a first TDD system included in a first TDD base station with a second TDD system including in the base station; and an offset determination module, adapted to determine an offset of a time slot of the second TDD system according to a time difference between time slots of the first TDD system and the second TDD system, wherein, the offset determination module comprises:

a first switch point determination module, adapted to determine a first switch point between uplink and downlink time slots of the first TDD system;

a second switch point determination module, adapted to determine a second switch point between uplink and downlink time slots of the second TDD system; and a first processing module, adapted to provide a time difference between the first switch point and the second switch point as the offset of each time slot of the second TDD system, wherein, the base station further comprises:

a comparison module, adapted to adjust a length of at least one of an UpPTS and a DwPTS in the special time slot field of the second TDD system if a GP in a special time slot field of the second TDD system after being offset does not overlap a GP in a special time slot field of the first TDD system; and a broadcast module, adapted to broadcast special time slot configuration information of the second TDD system that is adjusted.

10. The base station of claim 9, wherein, the matching module comprises:

an obtaining module, adapted to obtain a timing clock and a time slot allocation ratio of the first TDD system; and an allocation module, adapted to determine starting time of the second TDD system according to the timing clock and allocate the time slots of the second TDD system according to the time slot allocation ratio.

11. The base station of claim 10, wherein, the obtaining module is further adapted to obtain the timing clock and the time slot allocation ratio of the first TDD system directly from a first TDD base station including the first TDD system; or the obtaining module is further adapted to send a message for obtaining the timing clock and the time slot allocation ratio of the first TDD system to a first TDD base station including the first TDD system and receive the timing clock and the time slot allocation ratio of the first TDD system returned by the first TDD base station after receiving the message.

12. The base station of claim 9, further comprising:

an advance determination module, adapted to determine a transmission timing advance of a user equipment according to a deviation between random access time and desired time of the user equipment during establishing the uplink synchronization of the second TDD system; and a computing module, adapted to obtain a data transmission offset of the time slot by adding the offset of the time slot determined to the transmission timing advance determined.

* * * * *